(12) United States Patent
Tabata et al.

(10) Patent No.: US 8,129,493 B2
(45) Date of Patent: Mar. 6, 2012

(54) AROMATIC POLYESTER

(75) Inventors: Masayoshi Tabata, Muroran (JP);
Takayoshi Yamazaki, Yamatokoriyama (JP)

(73) Assignees: Muroran Institute of Technology, Hokkaido (JP); Nitta Corporation, Osaka-shi (JP)

( * ) Notice: Subject to any disclaimer, the term of this patent is extended or adjusted under 35 U.S.C. 154(b) by 4 days.

(21) Appl. No.: 12/871,213

(22) Filed: Aug. 30, 2010

(65) Prior Publication Data

US 2011/0092662 A1    Apr. 21, 2011

(30) Foreign Application Priority Data

Oct. 15, 2009 (JP) ................. 2009-238007

(51) Int. Cl.
*C08G 64/00* (2006.01)
*C08G 63/02* (2006.01)
(52) U.S. Cl. ............... 528/190; 428/411.1; 428/412; 528/196; 528/198
(58) Field of Classification Search ........... 428/411.1, 428/412; 528/190, 196, 198
See application file for complete search history.

(56) References Cited

U.S. PATENT DOCUMENTS

2004/0006193 A1    1/2004   Su

FOREIGN PATENT DOCUMENTS

| JP | 55-004771 | 1/1980 |
| JP | 2-276639 | 11/1990 |
| JP | 8-208815 | 8/1996 |
| JP | 2000-143788 | 5/2000 |
| JP | 2005-531682 | 10/2005 |
| JP | 2007-320989 | 12/2007 |

*Primary Examiner* — Terressa Boykin
(74) *Attorney, Agent, or Firm* — Jordan and Hamburg LLP (57) ABSTRACT

There is provided an aromatic polyester suitable for optical applications, which has not only high heat resistance and transparency, but also enhanced fluidity at a relatively low molding temperature of less than 300° C. despite its high molecular weight to be substantially colorless after the molding process. The aromatic polyester of the present invention comprises polyhydric phenol residues and residues of aromatic polycarboxylic acid, acid halide or acid anhydride thereof; wherein the polyhydric phenol residues comprise polyhydric phenol residues represented by Formula (I): —O—Ar—$W^1_x$—Ar—O— and/or Formula (II): —O—Ar—O—, and bulky polyhydric phenol residues represented by Formula (III): —O—Ar—$W^2$—Ar—O—; wherein the molar ratio of the polyhydric phenol residues represented by Formula (I) and/or Formula (II) to the polyhydric phenol residues represented by Formula (III) is in the range of 100:0 to 30:70 (exclusive of 100:0).

32 Claims, 3 Drawing Sheets

AROMATIC POLYESTER

BACKGROUND OF THE INVENTION

The present invention relates to an aromatic polyester, more particularly an aromatic polyester for optical applications.

Conventional aromatic polyesters are prepared by the following process. Aromatic polycarboxylic acid halide, e.g., terephthalic or isophthalic acid chloride, is dissolved in an organic solvent, e.g., methylene chloride, while 2,2-bis(4'-hydroxyphenyl)propane[bisphenol A] is dissolved in an aqueous alkali solution, e.g., aqueous sodium hydroxide solution. Then, these solutions are mixed at a room temperature in the presence of a surfactant, e.g., a quaternary ammonium salt to yield aromatic polyester by interfacial polymerization (Japanese Patent Publication No. S55(1980)-4771). The resulting aromatic polyester has high heat resistance, therefore it is useful. In the case where the molar ratio of terephthalic or isophthalic acid chloride to bisphenol A is close to 1, the resulting aromatic polyester is crystalline and insoluble in solvents due to extraordinarily high molecular weight, or has a high melting point of not less than 300° C., even if the polyester is dissolved in solvents. Accordingly, for processing such as injection molding, the polymer must be heated to a temperature of 300° C. or higher in order to enhance the fluidity during the processing, leading to formation of an undesirably colored product which cannot be used in optical applications requiring high transparency.

A disclosed polyester sheet having high transparency and heat resistance is a heat-resistant transparent multilayered plastic sheet including a core layer composed of a thermoplastic polyester having a predetermined number of ethylene terephthalate units, intermediate layers composed of a resin composition comprising a thermoplastic polyester and a polyarylate or a resin comprising a polyarylate only, the intermediate layers being laminated both sides of the core layer, and outermost layers composed of a copolyester prepared by replacing a part of the glycol component of the polyethylene terephthalate with 1,4-cyclohexanedimethanol, each of the layers having a predetermined thickness (Japanese Patent Application Laid-Open No. H02(1990)-276639). This patent application document discloses that copolyesters can be prepared by replacing a part of the glycol component of polyethylene terephthalate with 1,4-cyclohexane dimethanol, which is a concept of multi-component polyester. The concept, however, relates to polyethylene terephthalate only, and its purpose is focused on an improvement in heat resistance and transparency of material for food containers.

SUMMARY OF THE INVENTION

It is an object of the present invention to provide a substantially colorless aromatic polyester which has high heat resistance and transparency and enhanced fluidity at a relatively low molding temperature of less than 300° C. despite its high molecular weight. Such the polyester is suitable for optical applications.

The conventional aromatic polyester described in Japanese Patent Publication No. S55(1980)-4771 exhibits comparatively high heat-resistance, but is crystalline. The aromatic polyester, therefore, exhibits significantly low fluidity unsuitable for molding at a lower temperature of less than 300° C. not causing coloration. In addition, products molded at 300° C. or higher cannot be used in optical applications because of its coloration. Mere lowering of the crystallinity leads to a decrease in heat resistance. The inventors have made extensive investigation in order to obtain an aromatic polyester which is fluid enough to be moldable at a lower temperature of less than 300° C. by lowering the crystallinity while maintaining relatively high heat resistance. As a result, the inventors have found that an aromatic polyester having predetermined amounts of bulky polyhydric phenol residues represented by Formula (III) and polyhydric phenol residues represented by Formula (I) and/or Formula (II) has low crystallinity, resulting in high fluidity at a low temperature of less than 300° C., and exhibits not only higher heat-resistance but also higher transparency than conventional aromatic polyesters despite its lower crystallinity. The present invention has been completed based on these findings. Japanese Patent Application Laid-Open No. H02(1990)-276639 describes the concept of a multi-component system; however, the concept relates to polyethylene terephthalate rather than aromatic polyesters. Furthermore, the purpose is focused on improvements in heat resistance and transparency of the material used in food containers, and thus has no relation to aromatic polyesters for optical applications.

Accordingly, the present invention provides:

(1) An aromatic polyester comprising polyhydric phenol residues and residues of aromatic polycarboxylic acid, acid halide or acid anhydride thereof;

wherein the polyhydric phenol residues comprise polyhydric phenol residues represented by Formula (I):

$$-O-Ar-W^1{}_x-Ar-O- \qquad (I)$$

where each Ar independently denotes a phenylene or naphthylene group and may be independently substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, an $-SR^1$ group (where $R^1$ denotes a hydrogen atom or an alkyl group having 1 to 4 carbon atoms), and an $-R^3-NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and x is 0 or 1, where when x is 1, $W^1$ denotes a saturated or unsaturated acyclic or cyclic alkylene group having 1 to 30 carbon atoms, an oxygen atom, a sulfur atom, sulfinyl group, or sulfonyl group, and when x is 0, two Ar's are covalently bonded by a carbon atom contained in each Ar;

and/or represented by Formula (II):

$$-O-Ar-O- \qquad (II)$$

where Ar denotes a phenylene or naphthylene group, and Ar may be substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, an $-SR^1$ group (where $R^1$ denotes a hydrogen atom or an alkyl group having 1 to 4 carbon atoms), a $-R^3-NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and a phenyl group optionally substituted by an alkyl group having 1 to 4 carbon atoms; and polyhydric phenol residues represented by Formula (III):

$$-O-Ar-W^2-Ar-O- \qquad (III)$$

where each Ar independently denotes a phenylene or naphthylene group and may be independently substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, a —$SR^1$ group (where $R^1$ denotes a hydrogen atom or an alkyl group having 1 to 4 carbon atoms), and a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and $W^2$ denotes a saturated or unsaturated acyclic or cyclic alkylene group substituted by a phenyl group and/or naphthyl group and having 1 to 30 carbon atoms;

wherein the molar ratio of the polyhydric phenol residues represented by Formula (I) and/or Formula (II) to the polyhydric phenol residues represented by Formula (III) is in the range of 100:0 to 30:70 (exclusive of 100:0).

As preferred aspects of the present invention, mention may be made of:

(2) The aromatic polyester according to Aspect (1), wherein, in Formula (I), each Ar independently denotes a phenylene or naphthylene group and may be independently substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, an —$SR^1$ group (where $R^1$ denotes a hydrogen atom or an alkyl group having 1 to 4 carbon atoms), and an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and x is 0 or 1, where when x is 1, $W^1$ denotes a saturated or unsaturated acyclic or cyclic alkylene group having 1 to 6 carbon atoms, an oxygen atom, a sulfur atom, a sulfinyl group, or a sulfonyl group, and when x is 0, two Ar's are covalently bonded by a carbon atom contained in each Ar;

(3) The aromatic polyester according to Aspect (1), wherein, in Formula (I), each Ar independently denotes a phenylene or naphthylene group and may be independently substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, an —$SR^1$ group (where $R^1$ denotes a hydrogen atom or an alkyl group having 1 to 4 carbon atoms), and an —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and x is 0 or 1, where when x is 1, $W^1$ denotes a saturated acyclic alkylene group having 1 to 4 carbon atoms, an oxygen atom, a sulfur atom, a sulfinyl group, or a sulfonyl group, and when x is 0, two Ar's are covalently bonded by a carbon atom contained in each Ar;

(4) The aromatic polyester according to Aspect (1), wherein, in Formula (I), each Ar independently denotes a phenylene or naphthylene group and may be independently substituted by at least one group and/or atom selected from the group consisting of a saturated acyclic alkyl group having 1 to 4 carbon atoms, and a halogen atom, and x is 1, and $W^1$ denotes a saturated acyclic alkylene group having 1 to 4 carbon atoms;

(5) The aromatic polyester according to Aspect (1), wherein, in Formula (I), each Ar denotes a phenylene group and may be independently substituted by a saturated acyclic alkyl group having 1 to 4 carbon atoms, x is 1, and $W^1$ denotes a saturated acyclic alkylene group having 1 to 4 carbon atoms;

(6) The aromatic polyester according to any one of Aspects (1) to (5), wherein, in Formula (II), Ar denotes a phenylene or naphthylene group, and Ar may be substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, an —$SR^1$ group (where $R^1$ denotes a hydrogen atom or an alkyl group having 1 to 4 carbon atoms), a —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and a phenyl group optionally substituted by an alkyl group having 1 to 4 carbon atoms;

(7) The aromatic polyester according to any one of Aspects (1) to (5), wherein, in Formula (II), Ar denotes a phenylene or naphthylene group, and Ar may be substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, an —$SR^1$ group (where $R^1$ denotes a hydrogen atom or an alkyl group having 1 to 4 carbon atoms), a —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and a phenyl group optionally substituted by an alkyl group having 1 to 4 carbon atoms;

(8) The aromatic polyester according to any one of Aspects (1) to (5), wherein, in Formula (II), Ar denotes a phenylene or naphthylene group and may be substituted by at least one group and/or atom selected from the group consisting of a saturated acyclic alkyl group having 1 to 4 carbon atoms and a halogen atom;

(9) The aromatic polyester according to any one of Aspects (1) to (5), wherein, in Formula (II), Ar denotes a naphthylene group and may be substituted by at least one group selected from the group consisting of a saturated acyclic alkyl group having 1 to 4 carbon atoms;

(10) The aromatic polyester according to any one of Aspects (1) to (9), wherein, in Formula (III), each Ar independently denotes a phenylene or naphthylene group and may be independently substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, a —$SR^1$ group (where $R^1$ denotes a hydrogen atom or an alkyl group having 1 to 4 carbon atoms), and a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and $W^2$ denotes a saturated or unsaturated acyclic or cyclic alkylene group having 1 to 6 carbon atoms and substituted by a phenyl group and/or naphthyl group;

(11) The aromatic polyester according to any one of Aspects (1) to (9), wherein, in Formula (III), each Ar independently denotes a phenylene or naphthylene group and may be independently substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, a —SR$^1$ group (where R$^1$ denotes a hydrogen atom or an alkyl group having 1 to 4 carbon atoms), and a —R$^3$—NR$^2{}_2$ group (where each R$^2$ independently denotes a hydrogen atom or an alkyl group having 1 to 4 carbon atoms, and R$^3$ denotes an alkylene group having 1 to 4 carbon atoms or may be absent), and W$^2$ denotes a saturated alkylene group having 1 to 4 carbon atoms and substituted by a phenyl group and/or naphthyl group;

(12) The aromatic polyester according to any one of Aspects (1) to (9), wherein, in Formula (III), each Ar independently denotes a phenylene or naphthylene group and may be independently substituted by at least one group and/or atom selected from the group consisting of a saturated acyclic alkyl group having 1 to 4 carbon atoms and a halogen atom, and W$^2$ denotes a saturated acyclic alkylene group having 1 to 4 carbon atoms and substituted by a phenyl group and/or naphthyl group;

(13) The aromatic polyester according to any one of Aspects (1) to (9), wherein, in Formula (III), each Ar denotes a phenylene group and may be independently substituted by a saturated acyclic alkyl group having 1 to 4 carbon atoms, and W$^2$ denotes a saturated acyclic alkylene group having 1 to 4 carbon atoms and substituted by a phenyl group;

(14) The aromatic polyester according to Aspect (1), wherein the polyhydric phenol residue represented by Formula (I) is a 2,2-bis(4'-hydroxyphenyl)propane residue, the polyhydric phenol residue represented by Formula (II) is a 2,6-naphthalenediol residue, and the polyhydric phenol residue represented by Formula (III) is a 1,1-bis(4'-hydroxyphenyl)-1-phenylethane residue;

(15) The aromatic polyester according to Aspect (1), wherein the polyhydric phenol residues comprise the polyhydric phenol residues represented by Formula (I) and the polyhydric phenol residues represented by Formula (III), the polyhydric phenol residue represented by Formula (I) is a 2,2-bis(4'-hydroxyphenyl)propane residue, and the polyhydric phenol residue represented by Formula (III) is a 1,1-bis(4'-hydroxyphenyl)-1-phenylethane residue;

(16) The aromatic polyester according to any one of Aspects (1) to (15), wherein the molar ratio of the polyhydric phenol residues represented by Formula (I) and/or Formula (II) to the polyhydric phenol residues represented by Formula (III) is in the range of 95:5 to 50:50;

(17) The aromatic polyester according to any one of Aspects (1) to (15), wherein the molar ratio of the polyhydric phenol residues represented by Formula (I) and/or Formula (II) to the polyhydric phenol residues represented by Formula (III) is in the range of 95:5 to 80:20;

(18) The aromatic polyester according to any one of Aspects (1) to (17), wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 100:0 to 30:70 (exclusive of 100:0);

(19) The aromatic polyester according to any one of Aspects (1) to (17), wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 95:5 to 50:50;

(20) The aromatic polyester according to any one of Aspects (1) to (17), wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 95:5 to 80:20;

(21) The aromatic polyester according to any one of Aspects (1) to (20), wherein the weight average molecular weight (Mw) ranges from 2,000 to 100,000;

(22) The aromatic polyester according to any one of Aspects (1) to (20), wherein the weight average molecular weight (Mw) ranges from 10,000 to 80,000;

(23) The aromatic polyester according to any one of Aspects (1) to (20), wherein the weight average molecular weight (Mw) ranges from 15,000 to 60,000;

(24) The aromatic polyester according to any one of Aspects (1) to (23), wherein the melt flow rate (MFR, units: g/10 min, measurement conditions: 260° C., 10.0 kg) is 3.0 or greater;

(25) The aromatic polyester according to any one of Aspects (1) to (23), wherein the melt flow rate (MFR, units: g/10 min, measurement conditions: 260° C., 10.0 kg) is in the range of 3.0 to 100.0;

(26) The aromatic polyester according to any one of Aspects (1) to (23), wherein the melt flow rate (MFR, units: g/10 min, measurement conditions: 260° C., 10.0 kg) is in the range of 3.0 to 75.0;

(27) The aromatic polyester according to any one of Aspects (1) to (23), wherein the melt flow rate (MFR, units: g/10 min, measurement conditions: 260° C., 10.0 kg) is in the range of 3.0 to 50.0;

(28) The aromatic polyester according to any one of Aspects (1) to (27), wherein the glass transition temperature (Tg) is in the range of 120° C. to 250° C.;

(29) The aromatic polyester according to any one of Aspects (1) to (27), wherein the glass transition temperature (Tg) is in the range of 150° C. to 210° C.;

(30) The aromatic polyester according to any one of Aspects (1) to (27), wherein the glass transition temperature (Tg) is in the range of 170° C. to 200° C.;

(31) The aromatic polyester according to any one of Aspects (1) to (30), the aromatic polyester is an aromatic polyester for optical materials; and (32) The aromatic polyester according to any one of Aspects (1) to (30), the aromatic polyester is an aromatic polyester for optical fibers.

The aromatic polyester of the present invention has not only significantly high heat-resistance and transparency despite its low crystallinity, but also enhanced fluidity at a relatively low molding temperature of less than 300° C., for example, at 260° C., despite its high molecular weight, leading to substantially colorless molded products such as fibers. Such the polyester is significantly useful in optical applications.

Figure 1:
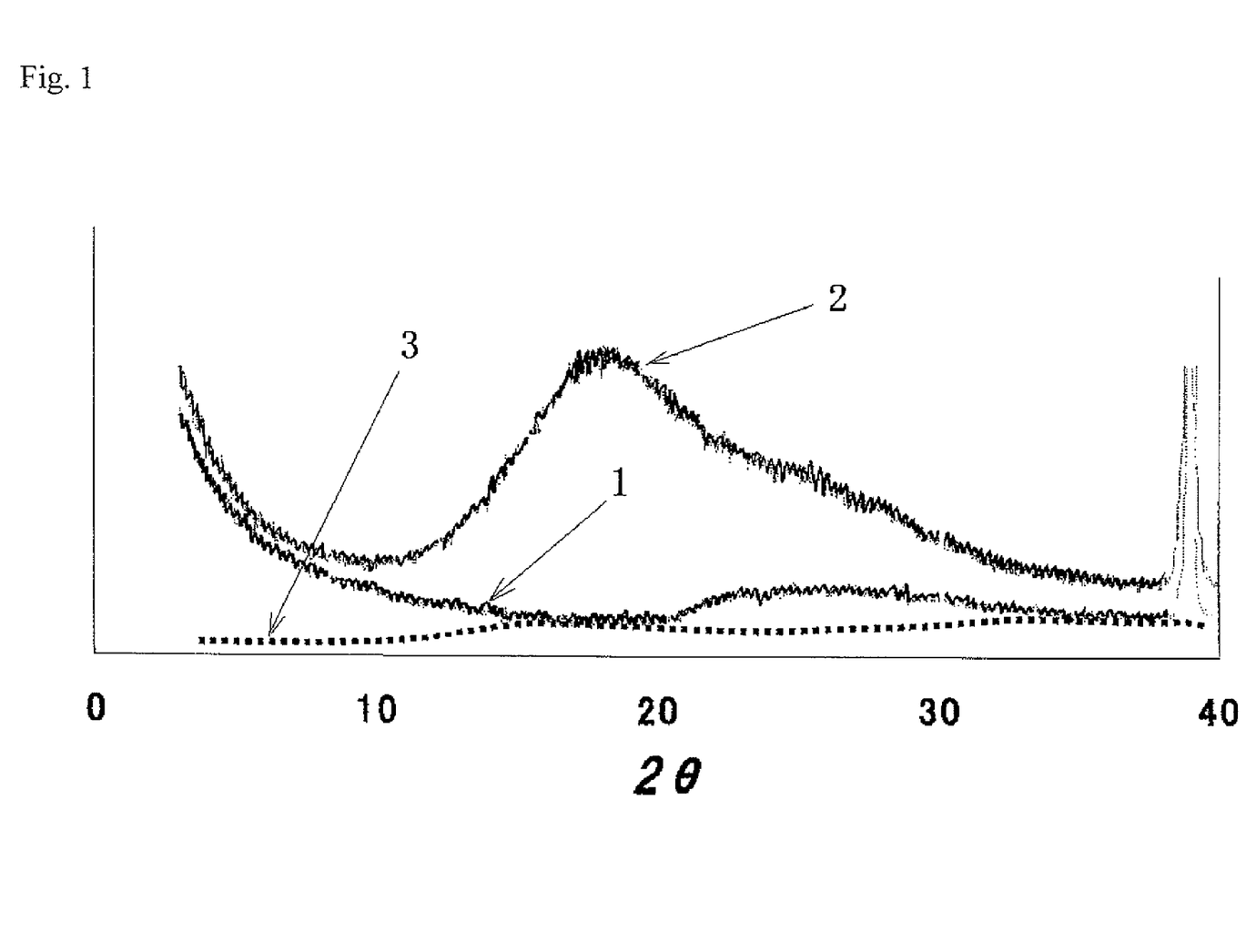
FIG. 1 is an X-ray diffraction chart of an aromatic polyester of the present invention (Example 1), a conventional aromatic polyester (Comparative Example 1), and polymethyl methacrylate (PMMA)
Figure 2:
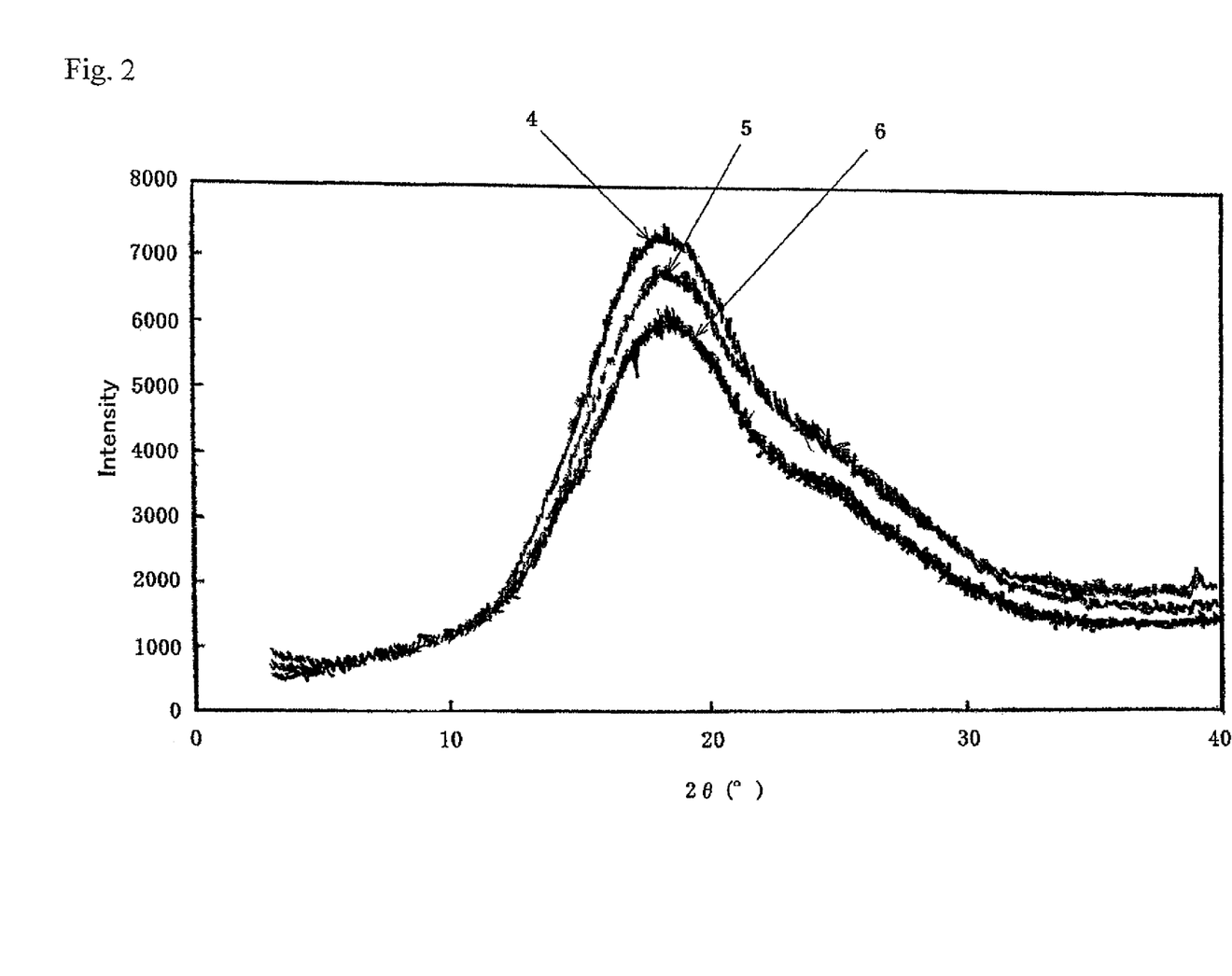
FIG. 2 is an X-ray diffraction chart of aromatic polyesters of the present invention (Examples 3, 8, and 11)
Figure 3:
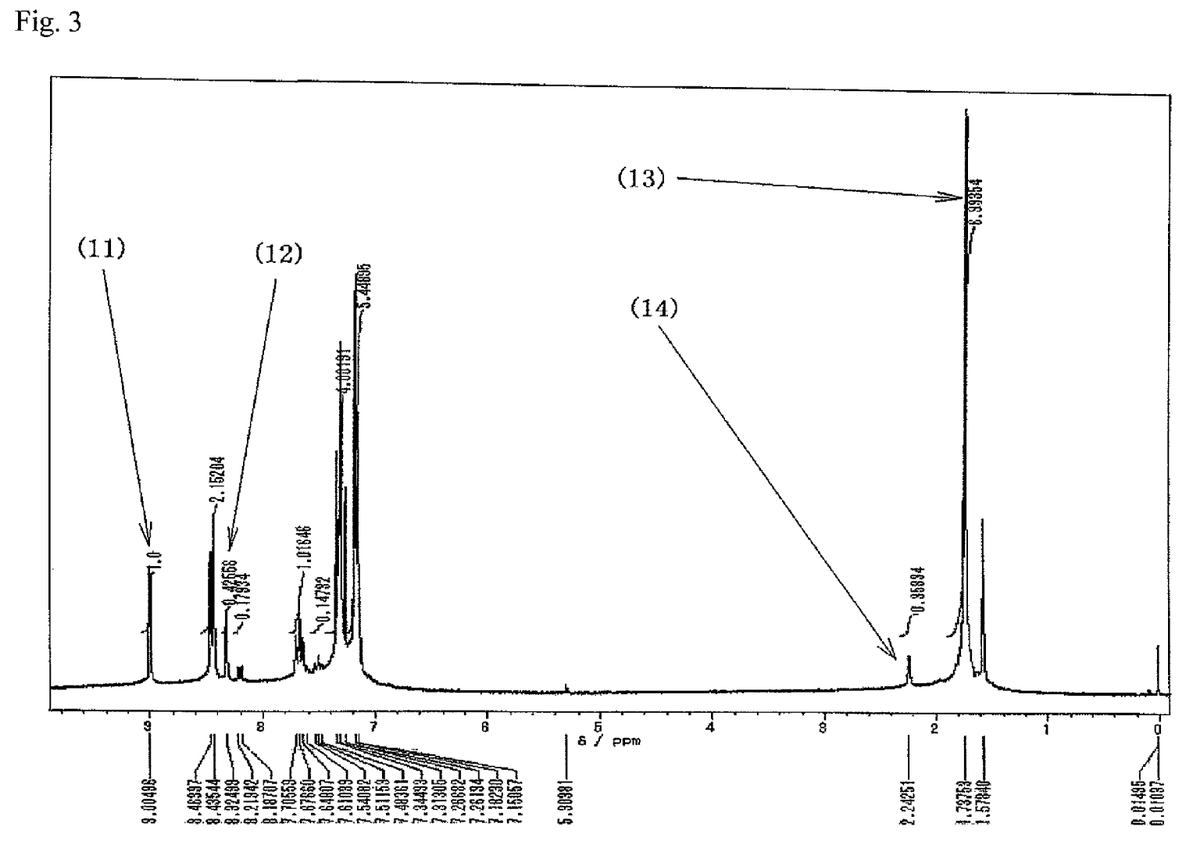
FIG. 3 is an NMR chart of an aromatic polyester of the present invention (Example 8).

In these figures, reference numeral 1 represents an X-ray diffraction pattern of Example 1, reference numeral 2 an X-ray diffraction pattern of Comparative Example 1, reference numeral 3 an X-ray diffraction pattern of polymethyl methacrylate (PMMA), reference numeral 4 an X-ray diffraction pattern of Example 3, reference numeral 5 an X-ray diffraction pattern of Example 11, and reference numeral 6 an X-ray diffraction pattern of Example 8. Reference numeral 11 represents a characteristic peak of an isophthaloyl dichloride residue, reference numeral 12 a characteristic peak of a terephthaloyl dichloride residue, reference numeral 13 a characteristic peak of a 2,2-bis(4'-hydroxyphenyl)propane [bisphenol A] residue, and reference numeral 14 a characteristic peak of a 1,1-bis(4'-hydroxyphenyl)-1-phenylethane[4,4'-(α-methylbenzylidene)bisphenol] residue.

DETAILED DESCRIPTION OF THE INVENTION

The aromatic polyester of the present invention comprises polyhydric phenol residues and residues of aromatic polycarboxylic acid, acid halide or acid anhydride thereof;
wherein the polyhydric phenol residues comprise polyhydric phenol residues represented by Formula (I):

(I)

and/or polyhydric phenol residues represented by Formula (II):

(II)

and polyhydric phenol residues represented by Formula (III):

(III).

In Formula (I), each Ar independently denotes a phenylene or naphthylene group, and preferably a phenylene group. Each Ar may be independently substituted by at least one group and/or atom selected from the group consisting of a saturated or unsaturated acyclic or cyclic alkyl group having 1 to 12 carbon atoms, preferably a saturated or unsaturated acyclic or cyclic alkyl group having 1 to 6 carbon atoms, and more preferably a saturated acyclic alkyl group having 1 to 4 carbon atoms; a saturated or unsaturated acyclic or cyclic alkoxy group having 1 to 12 carbon atoms, preferably a saturated or unsaturated acyclic or cyclic alkoxy group having 1 to 6 carbon atoms, and more preferably a saturated acyclic alkoxy group having 1 to 4 carbon atoms; a halogen atom, preferably a fluorine, chlorine, bromine or iodine atom, and more preferably a chlorine atom; a nitro group; an —$SR^1$ group (where $R^1$ denotes a hydrogen atom or an alkyl group having 1 to 4 carbon atoms), preferably an —SH group; and an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and preferably —$NH_2$. In Formula (I), x is 0 or 1, and preferably x is 1. When x is 1, $W^1$ denotes a saturated or unsaturated acyclic or cyclic alkylene group (including alkylidene group) having 1 to 30 carbon atoms, preferably a saturated or unsaturated acyclic or cyclic alkylene group (including alkylidene group) having 1 to 6 carbon atoms, more preferably a saturated acyclic alkylene group (including alkylidene group) having 1 to 4 carbon atoms, an oxygen atom, a sulfur atom, sulfinyl group, or sulfonyl group. When x is 0, two Ar's are covalently bonded by a carbon atom contained in each Ar.

In Formula (II), Ar denotes a phenylene or naphthylene group, and preferably a naphthylene group. Ar may be substituted by at least one group and/or atom selected from the group consisting of a saturated or unsaturated acyclic or cyclic alkyl group having 1 to 12 carbon atoms, preferably a saturated or unsaturated acyclic or cyclic alkyl group having 1 to 6 carbon atoms, more preferably a saturated acyclic alkyl group having 1 to 4 carbon atoms; a saturated or unsaturated acyclic or cyclic alkoxy group having 1 to 12 carbon atoms, preferably a saturated or unsaturated acyclic or cyclic alkoxy group having 1 to 6 carbon atoms, more preferably a saturated acyclic alkoxy group having 1 to 4 carbon atoms; a halogen atom, preferably a fluorine, chlorine, bromine or iodine atom, and more preferably a chlorine atom; a nitro group, an —$SR^1$ group (where $R^1$ denotes a hydrogen atom or an alkyl group having 1 to 4 carbon atoms), and preferably an —SH group; an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), preferably —$NH_2$; and a phenyl group optionally substituted by an alkyl group having 1 to 4 carbon atoms, and preferably a phenyl group.

In Formula (III), each Ar independently denotes a phenylene or naphthylene group, and preferably a phenylene group. Each Ar may be independently substituted by at least one group and/or atom selected from the group consisting of a saturated or unsaturated acyclic or cyclic alkyl group having 1 to 12 carbon atoms, preferably a saturated or unsaturated acyclic or cyclic alkyl group having 1 to 6 carbon atoms, and more preferably a saturated acyclic alkyl group having 1 to 4 carbon atoms; a saturated or unsaturated acyclic or cyclic alkoxy group having 1 to 12 carbon atoms, preferably a saturated or unsaturated acyclic or cyclic alkoxy group having 1 to 6 carbon atoms, more preferably a saturated acyclic alkoxy group having 1 to 4; a halogen atom, preferably a fluorine, chlorine, bromine or iodine atom, and more preferably a chlorine atom; a nitro group, an —$SR^1$ group (where $R^1$ denotes a hydrogen atom or an alkyl group having 1 to 4 carbon atoms), and preferably an —SH group; and an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbons or may be absent), and preferably —$NH_2$. $W^2$ denotes a saturated or unsaturated acyclic or cyclic alkylene group (including alkylidene group) substituted by a phenyl group and/or naphthyl group, preferably a phenyl group, and having 1 to 30 carbon atoms, preferably a saturated or unsaturated acyclic or cyclic alkylene group (including alkylidene group) having 1 to 6 carbon atoms, and more preferably a saturated acyclic alkylene group (including alkylidene group) having 1 to 4 carbon atoms.

Examples of the residue of the polyhydric phenol represented by the formula (I) include residues of the following polyhydric phenols, such as 2,2'-dihydroxybiphenyl, 3,3'-dihydroxybiphenyl, 3,4'-dihydroxybiphenyl, 4,4'-dihydroxydiphenyl ether, 2,2-bis-(4'-hydroxyphenyl)propane[bisphenol A], 2,4'-dihydroxydiphenylmethane, bis-(4-hydroxyphenyl)methane, bis-(2-hydroxyphenyl)methane, 3,3'-methylidenebisphenol, 1,1-bis-(4'-hydroxyphenyl)ethane, 1,1-bis-(4'-hydroxyphenyl)cyclohexane, 1,2-bis-(4'-hydroxyphenyl)ethane, 1,1-bis-(4'-hydroxy-2'-chlorophenyl)ethane, 2,2-bis-(3',5'-dimethyl-4'-hydroxyphenyl)propane, 2,2-bis-(4'-hydroxyphenyl)pentane, bis-(4'-hydroxyphenyl)ether, 4,3'-dihydroxydiphenyl ether, 4,2'-dihydroxydiphenyl ether, 2,2'-dihydroxydiphenyl ether, 2,3'-dihydroxydiphenyl ether, 4,4'-dihydroxy-2,6-dimethyl diphenyl ether, 3,4'-dihydroxydiphenyl, bis-(4-hydroxyphenyl)sulfone, bis-(3-hydroxyphenyl)sulfone, 2,4'-dihydroxydiphenylsulfone, 2,2'-methylidenebis(4-methylphenol), 2,2'-methylidenebis(5-methylphenol), 2,2'-methylidenebis(6-methylphenol), 4,4'-methylidenebis(2-methylphenol), 4,4'-methylidenebis(3-methylphenol), 2,2'-methylidenebis(4,6-dimethylphenol), 2,2'-methylidenebis(3,5-dimethylphenol), 4,4'-methylidenebis(2,6-dimethylphenol), 3,3'-methylidenebis(2,4,6-trimethylphenol), 2,2'-methylidenebis(4-propylphenol), 4,4'-methylidenebis(2-propylphenol), 4,4'-methylidenebis(2-methyl-6-ethylphenol), 2,2'- methylidenebis(3,4,5,6-tetramethylphenol), 4,4'-methylidenebis(2,3,5,6-tetramethylphenol), 2,2'-methylidenebis(4-tert-butylphenol), 4,4'-methylidenebis(2-methyl-5-isopropylphenol), 4,4'-methylidenebis(3-methyl-6-isopropylphenol), 4,4'-methylidenebis(5-methyl-6-isopropylphenol), 2,2'-methylidenebis(4-tert-butyl-6-methylphenol), 2,2'-methylidenebis(6-tert-butyl-4-methylphenol), 4,4'-methylidenebis(4-tert-butyl-6-methylphenol), 4,4'-methylidenebis(2-tert-butyl-5-methylphenol), 2,2'-methylidenebis(3,4-dimethyl-6-isopropylphenol), 2,2'-methylidenebis(6-tert-butyl-4-methylphenol), 2,2'-methylidenebis(4-(1,1,3,3-tetramethylbutyl)phenol), 2,2'-methylidenebis(4,6-ditert-butylphenol), 2,2'-methylidenebis(4,6-tert-butylphenol), 4,4'-methylidenebis(2,6-tert-butylphenol), 4,4'-methylidenebis(3,5-ditert-butylphenol), 2,2'-methylidenebis(4-chlorophenol), 4,4'-methylidenebis(2-chlorophenol), 2,2'-methylidenebis(4-bromophenol), 2,2'-methylidenebis(4,6-dichlorophenol), 2,2'-methylidenebis(4,5-dichlorophenol), 3,3'-methylidenebis(4,5-dichlorophenol), 4,4'-methylidenebis(2,5-dichlorophenol), 4,4'-methylidenebis(2,6-dichlorophenol), 2,2'-methylidenebis(4,6-dibromophenol), 4,4'-methylidenebis(2,6-dibromophenol), 2,2'-methylidenebis(3,4,6-trichlorophenol), 3,3'-methylidenebis(2,4,6-trichlorophenol), 2,2'-methylidenebis(6-bromo-4-chlorophenol), 2,2'-methylidenebis(4-bromo-6-nitrophenol), 2,2'-methylidenebis(6-chloro-4-nitrophenol), 2,2'-methylidenebis(4-nitrophenol), 4,4'-methylidenebis(2-nitrophenol), 2,2'-methylidenebis(4,6-dinitrophenol), 3,3'-methylidenebis(6-methoxyphenol), 4,4'-methylidenebis(2-methoxyphenol), bis-(4-hydroxy-2,6-dimethyl-3-methoxyphenyl)methane, 2,2'-methylidenebis(4-chloro-6-methylphenol), 2,2'-methylidenebis(6-chloro-4-methylphenol), 4,4'-methylidenebis(2-chloro-6-methylphenol), 2,2'-methylidenebis(6-bromo-4-methylphenol), 4,4'-methylidenebis(6-bromo-2-methylphenol), 2,2'-methylidenebis(4-chloro-3,5-dimethylphenol), 2,2'-methylidenebis(3-chloro-4,6-dimethylphenol), 2,2'-methylidenebis(6-bromo-4,5-dimethylphenol), 4,4'-methylidenebis(2-chloro-3,5,6-trimethylphenol), 2,2'-methylidenebis(4-chloro-6-isopropylphenol), 2,2'-methylidenebis(6-chloro-4-tert-butylphenol), 2,2'-methylidenebis(4-chloro-3-methyl-6-isopropylphenol), 2,2'-methylidenebis(4-chloro-6-tert-butyl-3-methylphenol), 2,2'-methylidenebis(4,6-dichloro-3-methylphenol), 2,2'-methylidenebis(6-nitro-4-tert-butylphenol), 2,2'-isopropylidenebis(5-methylphenol), 4,4'-isopropylidenebis(2-methylphenol), 4,4'-isopropylidenebis(2-cyclohexylphenol), 4,4'-isopropylidenebis(2,6-dibromophenol), 4,4'-isopropylidenebis(2-nitrophenol), 4,4'-isopropylidenebis(2,6-dinitrophenol), 4,4'-butanediylbis(2-methylphenol), 4,4'-butylidenebisphenol, 2,2'-butylidenebis(6-tert-butyl-4-methylphenol), 4,4'-butylidenebis(6-tert-butyl-2-methylphenol), 4,4'-sec-butylidenebisphenol, 4,4'-sec-butylidenebis(3-methylphenol), 2,2'-sec-butylidenebis(3-methyl-6-isopropylphenol), 2,2'-sec-butylidenebis(6-tert-butyl-4-methylphenol), 4,4'-isobutylidenebisphenol, 4,4'-isobutylidenebis(6-tert-butyl-4-methylphenol), 4,4'-(1,3-cyclohexanediyl)bisphenol, 4,4'-cyclohexylidenebisphenol, 4,4'-cyclohexylidenebis(2-chlorophenol), 4,4'-cyclohexylidenebis(2,6-dichlorophenol), 2,2'-thiobisphenol, 4,4'-thiobisphenol, 4,4'-thiobis(2-methylphenol), 2,2'-thiobis(4,5-dimethylphenol), 2,2'-thiobis(4,6-dimethylphenol), 4,4'-thiobis(2,6-dimethylphenol), 2,2'-thiobis(6-tert-butyl-4-methylphenol), 4,4'-thiobis(2-tert-butyl-5-methylphenol), 2,2'-thiobis(4-fluorophenol), 2,2'-thiobis(4-chlorophenol), 4,4'-thiobis(3-chlorophenol), 2,2'-thiobis(4-chloro-5-methylphenol), 2,2'-thiobis(4,6-dichlorophenol), 4,4'-thiobis(2-bromophenol), 2,2'-thiobis(5-nitrophenol), 4,4'-sulfinylbisphenol, 4,4'-sulfinylbis(2-methylphenol), 4,4'-sulfinylbis(2-tert-butyl-5-methylphenol), 4,4'-sulfinylbis(2-chlorophenol), 4,4'-sulfinylbis(4-chlorophenol), 2,2'-sulfinylbis(4,6-dichlorophenol), 4,4'-sulfinylbis(2-bromophenol), 2,2'-sulfonylbisphenol, 4,4'-sulfonylbisphenol, 4,4'-sulfonylbis(2-methylphenol), 4,4'-sulfonylbis(2,5-dimethylphenol), 4,4'-sulfonylbis(2-tert-butyl-5-methylphenol), 4,4'-sulfonylbis(2-chlorophenol), 4,4'-sulfonylbis(3-chlorophenol), 4,4'-sulfonylbis(2-bromophenol), 4,4'-sulfonylbis(2-nitrophenol), 1,1'-binaphthalene-2,2'-diol, 2,2-bis-(4-hydroxynaphthyl)propane, bis-(hydroxynaphthyl)ether, and 2,2'-ethanediyldimercaptobisphenol. Among these, preference is given to residues of 2,2-bis(4'-hydroxyphenyl)propane [bisphenol A], 1,1-bis-(4'-hydroxyphenyl)ethane and bis-(4-hydroxyphenyl)methane, and a residue of 2,2-bis(4'-hydroxyphenyl)propane[bisphenol A] is more preferable.

Examples of the residue of the polyhydric phenol represented by the formula (II) include residues of the following polyhydric phenols, such as 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, catechol, 3-methylcatechol, 4-methylcatechol, 3-ethylcatechol, 4-ethylcatechol, 3-n-propylcatechol, 4-n-propylcatechol, 3-(t-butyl)catechol, 3-n-pentylcatechol, 4-n-pentylcatechol, 4-(1,1-dimethylpropyl)catechol, 4-hexylcatechol, 4-cyclohexylcatechol, 4-(1,1,3,3-tetramethylbutyl)catechol, 4-nonylcatechol, 3,4-dimethylcatechol, 3,5-dimethylcatechol, 3,6-dimethylcatechol, 4,5-dimethylcatechol, 4-methyl-5-ethylcatechol, 3-chlorocatechol, 4-chlorocatechol, 3-bromocatechol, 4-bromocatechol, 3-fluorocatechol, 4-fluorocatechol, 3,5-dichlorocatechol, 4,5-dichlorocatechol, 3,4-dichlorocatechol, 3,4-dibromocatechol, 3,5-dibromocatechol, 4,5-dibromocatechol, 4-chloro-5-nitrocatechol, 3-chloro-6-methoxycatechol, 5-bromo-4-nitrocatechol, 4-bromo-5-methylcatechol, 3-bromo-5-(t-butyl)catechol, 3,4,5-trichlorocatechol, 3,4,5-tribromocatechol, 3,4,6-tribromocatechol, tetrachlorocatechol, tetrabromocatechol, 3-aminocatechol, 4-aminocatechol, 3-(2-aminoethyl)catechol, 4-(2-methylaminoethyl)catechol, 4-(2-dimethylaminoethyl)catechol, 4-(2-aminoethyl)catechol, 6-amino-4-(2-aminoethyl)catechol, 3-nitrocatechol, 3,4-dinitrocatechol, 4,5-dinitrocatechol, 3-nitro-6-methoxycatechol, 4-nitro-3-methoxycatechol, 5-nitro-3-methylcatechol, 4-methoxycatechol, 6-methoxycatechol, 3-propioxycatechol, 3-butyloxycatechol, 3,4-dimethoxycatechol, 3,6-dimethoxycatechol, 5-methoxy-3-(t-butyl)catechol, 3-ethoxy-(t-butyl)catechol, 3,4,6-trimethoxycatechol, resorcinol, 2-chlororesorcinol, 4-chlororesorcinol, 5-chlororesorcinol, 2,4-dichlororesorcinol, 4,6-dichlororesorcinol, 2,4,6-trichlororesorcinol, 2-bromo-4-chlororesorcinol, 4-bromo-2-chlororesorcinol, 4-chloro-5-methylresorcinol, 6-chloro-4-ethylresorcinol, 2-chloro-4-butylresorcinol, 6-chloro-4-butylresorcinol, 6-chloro-4-cyclohexylresorcinol, 2,4-dichloro-5-methylresorcinol, trichlororesorcinol, 2-bromoresorcinol, 4-bromoresorcinol, 5-bromoresorcinol, 2,4-dibromoresorcinol, 4,6-dibromoresorcinol, 2,4,6-tribromoresorcinol, 6-bromo-4-butylresorcinol, 2-iodoresorcinol, 4-iodoresorcinol, 5-iodoresorcinol, 4,6-diiodoresorcinol, 2,4,6-triiodoresorcinol, 2-aminoresorcinol, 5-aminoresorcinol, 4-amino-2,5-dimethylresorcinol, 5-mercaptoresorcinol, 5-methylthioresorcinol, 5-ethylthioresorcinol, 5-propylthioresorcinol, 5-butylthioresorcinol, 2-nitroresorcinol, 4-nitroresorcinol, 5-nitroresorcinol, 2,4-dinitroresorcinol, 4,6-dinitroresorcinol, 2,4,6-trinitroresorcinol, tetranitroresorcinol, 6-nitro-5-methoxyresorcinol, 2-nitro-5-methoxyresorcinol, 4-nitro-5-methoxyresorcinol, 2,4-dinitro-5-methylresorcinol, 2,4,6-trinitro-5-methylresorcinol, 2-methoxyresorcinol, 4-methoxyresorcinol, 5-methoxyresorcinol, 2,3-methoxyresorcinol, 2,5-methoxyresorcinol, 2-methoxy-5-methylresorcinol, 5-methoxy-4-methylresorcinol, 5-methoxy-6-methylresorcinol, 5-ethoxyresorcinol, 2-methylresorcinol, 4-methylresorcinol, 5-methylresorcinol, 2-ethylresorcinol, 4-ethylresorcinol, 5-ethylresorcinol, 2-n-propylresorcinol, 4-n-propylresorcinol, 5-n-propylresorcinol, 2-(2-propenyl)resorcinol, 4-(2-propenyl)resorcinol, 4-(1-methylethenyl)resorcinol, 4-(2-methylethenyl)resorcinol, 2-n-butylresorcinol, 4-n-butylresorcinol, 5-n-butylresorcinol, 2-n-butylresorcinol, 5-sec-butylresorcinol, 4-tert-butylresorcinol, 2-n-pentylresorcinol, 4-n-pentylresorcinol, 5-n-pentylresorcinol, 4-(1-methylbutyl)resorcinol, 5-(2-methyl-1-ethylpropyl)resorcinol, 2-n-hexylresorcinol, 4-n-hexylresorcinol, 5-n-hexylresorcinol, 4-(4-methylpentyl)resorcinol, 5-(4-methylpentyl)resorcinol, 5-(1,1-dimethylbutyl)resorcinol, 5-(1,2-dimethylbutyl)resorcinol, 5-(1-methyl-1-pentenyl)resorcinol, 4-cyclohexylresorcinol, 4-phenylresorcinol, 4-heptylresorcinol, 5-heptylresorcinol, 5-(1-methylhexyl)resorcinol, 4-phenylmethylresorcinol, 2-octylresorcinol, 4-octylresorcinol, 5-octylresorcinol, 4-(1-methylheptyl)resorcinol, 4-(1,1,3,3-tetramethylbutyl)resorcinol, 4-(2-phenylethyl)resorcinol, 5-nonylresorcinol, 5-(1-methyloctyl)resorcinol, 5-(1,1-dimethylheptyl)resorcinol, 5-(1,2-dimethylheptyl)resorcinol, 5-(1,2,4-trimethylhexyl)resorcinol, 4-decylresorcinol, 5-(1-methylnonyl)resorcinol, 2,4-dimethylresorcinol, 2,5-dimethylresorcinol, 4,5-dimethylresorcinol, 4,6-dimethylresorcinol, 4-ethyl-2-methylresorcinol, 5-ethyl-2-methylresorcinol, 2-ethyl-4-methylresorcinol, 5-ethyl-4-methylresorcinol, 6-ethyl-4-methylresorcinol, 5-ethenyl-4-methylresorcinol, 2,4-dimethylresorcinol, 5-methyl-4-propylresorcinol, 2-methyl-5-sec-butylresorcinol, 4,6-di(isopropyl)resorcinol, 4-ethyl-6-pentylresorcinol, 4,6-di(tert-butyl)resorcinol, 2,4,5-trimethylresorcinol, 2,4,6-trimethylresorcinol, 4,5,6-trimethylresorcinol, 4,6-dimethyl-5-sec-butylresorcinol, tetramethylresorcinol, 5-trifluoromethylresorcinol, hydroquinone, phenylhydroquinone, chlorohydroquinone, methylhydroquinone, trifluorohydroquinone, tetrafluorohydroquinone, 2-chloro-3-methoxyhydroquinone, 2-chloro-5-methoxyhydroquinone, 2-chloro-6-methoxyhydroquinone, 2,3-dichlorohydroquinone, 2,5-dichlorohydroquinone, 2,6-dichlorohydroquinone, trichlorohydroquinone, tetrachlorohydroquinone, bromohydroquinone, 3-bromo-2,6-dimethylhydroquinone, 2,5-dibromohydroquinone, 2,6-dibromohydroquinone, tribromohydroquinone, iodohydroquinone, 2,6-diiodohydroquinone, tetraiodohydroquinone, nitrohydroquinone, 2,6-dinitrohydroquinone, methoxyhydroquinone, 2-methoxy-3-methylhydroquinone, 2-methoxy-5-methylhydroquinone, 3-methoxy-2-methylhydroquinone, 5-methoxy-2-methylhydroquinone, 2-methoxy-6-propylhydroquinone, 2-methoxy-5-propenylhydroquinone, 2,3-dimethoxyhydroquinone, 2,5-dimethoxyhydroquinone, 2,6-dimethoxyhydroquinone, mercaptohydroquinone, methylhydroquinone, 2-methyl-6-ethylhydroquinone, 2-methyl-5-isopropylhydroquinone, 2-methyl-5-cyclohexylhydroquinone, 2,3-dimethylhydroquinone, 2,5-dimethylhydroquinone, 2,6-dimethylhydroquinone, trimethylhydroquinone, tetramethylhydroquinone, ethylhydroquinone, 2,6-diethylhydroquinone, vinylhydroquinone, n-propylhydroquinone, isopropylhydroquinone, 1-propenylhydroquinone, 2-propenylhydroquinone, 2,5-diisopropylhydroquinone, 4-butylhydroquinone, 2,3-di(tert-butyl)hydroquinone, 2,5-di(tert-butyl)hydroquinone, 2,6-di(tert-butyl)hydroquinone, hexylhydroquinone, 4-methylpentylhydroquinone, cyclohexylhydroquinone, 4-phenylmethylhydroquinone, and octylhydroquinone. Among these, preference is given to residues of 2,6-dihydroxynaphthalene, hydroquinone and resorcinol, and a residue of 2,6-dihydroxynaphthalene is more preferable.

Examples of the residue of the polyhydric phenol represented by the formula (III) include residues of the following polyhydric phenols, such as bis(4-hydroxyphenyl)phenylmethane, bis(4-hydroxyphenyl)diphenylmethane, 1,1-bis(4'-hydroxyphenyl)-1-phenylethane[4,4'-(α-methylbenzylidene)bisphenol], 1,1-bis(4'-hydroxyphenyl)-1,2-diphenylethane, 1,1-bis(4'-hydroxyphenyl)-2-phenylethane, 1,1-bis(4'-hydroxyphenyl)-1-phenylpropane, 1,1-bis(4'-hydroxyphenyl)-1-naphthylethane, 2,2-bis(4'-hydroxyphenyl)-1,3-diphenylpropane, 9,9-bis(4-hydroxyphenyl)fluorene, and 9,9-bis(5-methyl-4-hydroxyphenyl)fluorene. Among these, preference is given to residues of 1,1-bis(4'-hydroxyphenyl)-1-phenylethane and 2,2-bis(4'-hydroxyphenyl)-1,3-diphenylpropane, and a residue of 1,1-bis(4'-hydroxyphenyl)-1-phenylethane is more preferable.

A preferred combination of the polyhydric phenol residues of the present invention includes a polyhydric phenol residue represented by Formula (I) and a polyhydric phenol residue represented by Formula (III), wherein the polyhydric phenol residue represented by Formula (I) is a 2,2-bis(4'-hydroxyphenyl)propane residue, and the polyhydric phenol residue represented by Formula (III) is a 1,1-bis(4'-hydroxyphenyl)-1-phenylethane residue.

In the aromatic polyester of the present invention, the molar ratio of the polyhydric phenol residues represented by Formula (I) and/or Formula (II) to the polyhydric phenol residues represented by Formula (III) is in the range of 100:0 to 30:70 (exclusive of 100:0), preferably in the range of 95:5 to 50:50, more preferably in the range of 95:5 to 80:20, and still more preferably 95:5 to 85:15. A proportion of the polyhydric phenol residues represented by Formula (III) exceeding the upper limit may cause a significantly low MFR value of the aromatic polyester, resulting in insoluble and infusible resin. A proportion below the lower limit may also result in a significantly low MFR value of the aromatic polyester, rendering the polyester insoluble and infusible.

According to the present invention, examples of the residue of an aromatic polycarboxylic acid, or an acid halide or acid anhydride thereof include residues of the following aromatic polycarboxylic acids, acid halides thereof and acid anhydrides thereof. Examples of an aromatic dicarboxylic acid include phthalic acid, dimethyl phthalate, diphenyl phthalate, isophthalic acid, dimethyl isophthalate, di(cyanomethyl) isophthalate, diphenyl isophthalate, di(2,4-dinitrophenyl) isophthalate, (1,1-dioxobenzothiophene-3-yl) isophthalate, di(3-benzoisoxazolyl) isophthalate, di(2-benzothiazolyl) isophthalate, (1-benzotriazolyl) isophthalate, S,S'-dipropyl dithioisophthalate, S,S'-di(p-nitrophenyl) dithioisophthalate, S,S'-di(2-benzoxazolyl) dithioisophthalate, S,S'-di(2-benzothiazolyl) dithioisophthalate, 4-methylisophthalic acid, dimethyl isophthalate, 5-methylisophthalic acid, dimethyl 5-methylisophthalate, 4,5-dimethylisophthalic acid, 4,6-dimethylisophthalic acid, 4-chloroisophthalic acid, dimethyl 4-chloroisophthalate, 5-chloroisophthalic acid, dimethyl 5-chloroisophthalate, 4,6-dichloroisophthalic acid, dimethyl 4,6-dichloroisophthalate, 4-bromoisophthalic acid, 4,6-dibromoisophthalic acid, dimethyl 4,6-dibromoisophthalate, terephthalic acid, dimethyl terephthalate, di(cyanomethyl) terephthalate, diphenyl terephthalate, di(3-benzoisoxazolyl)

terephthalate, di(2-benzothiazolyl) terephthalate, 2-methylterephthalic acid, dimethyl 2-methylterephthalate, 2,5-dimethylterephthalic acid, 2,6-dimethylterephthalic acid, dimethyl 2,6-dimethylterephthalate, 2-chloroterephthalic acid, dimethyl 2-chloroterephthalate, 2,5-dichloroterephthalic acid, dimethyl 2,5-dichloroterephthalate, tetrachloroterephthalic acid, dimethyl tetrachloroterephthalate, 2-bromoterephthalic acid, dimethyl 2-bromoterephthalate, 2,5-dibromoterephthalic acid, diethyl 2,5-dibromoterephthalate, 2,2'-diphenyldicarboxylic acid, 3,3'-diphenyldicarboxylic acid, 3,4'-diphenyldicarboxylic acid, 4,4'-diphenyldicarboxylic acid, 3,4'-dicarboxydiphenyl ether, 4,4'-dicarboxydiphenyl ether, 1,2-naphthalenedicarboxylic acid, dimethyl 1,2-naphthalenedicarboxylate, 1,3-naphthalenedicarboxylic acid, 1,4-naphthalenedicarboxylic acid, dimethyl 1,4-naphthalenedicarboxylate, 1,5-naphthalenedicarboxylic acid, dimethyl 1,5-naphthalene dicarboxylate, 1,6-naphthalene dicarboxylic acid, dimethyl 1,6-naphthalenedicarboxylate, diphenyl 1,6-naphthalenedicarboxylate, 1,7-naphthalenedicarboxylic acid, dimethyl 1,7-naphthalenedicarboxylate, 1,8-naphthalenedicarboxylic acid, dimethyl 1,8-naphthalenedicarboxylate, diphenyl 1,8-naphthalenedicarboxylate, 2,3-naphthalenedicarboxylic acid, dimethyl 2,3-naphthalenedicarboxylate, diphenyl 2,3-naphthalenedicarboxylate, 2,6-naphthalenedicarboxylic acid, dimethyl 2,6-naphthalenedicarboxylate, diphenyl 2,6-naphthalenedicarboxylate, 2,7-naphthalenedicarboxylic acid, diphenyl 2,7-naphthalenedicarboxylate, 1,2-(9-oxofluorene)dicarboxylic acid, dimethyl 1,2-(9-oxofluorene)dicarboxylate, dimethyl 1,5-(9-oxofluorene)dicarboxylate, 1,6-(9-oxofluorene)dicarboxylic acid, dimethyl 1,6-(9-oxofluorene)dicarboxylate, 1,7-(9-oxofluorene)dicarboxylic acid, dimethyl 1,7-(9-oxofluorene)dicarboxylate, 2,3-(9-oxofluorene)dicarboxylic acid, dimethyl 2,3-(9-oxofluorene) dicarboxylate, 2,7-(9-oxofluorene)dicarboxylic acid, dimethyl 2,7-(9-oxofluorene)dicarboxylate, 1,4-anthracenedicarboxylic acid, 1,5-anthracenedicarboxylic acid, diethyl 1,5-anthracenedicarboxylate, 1,8-anthracenedicarboxylic acid, 1,9-anthracenedicarboxylic acid, 2,3-anthracenedicarboxylic acid, 9,10-anthracenedicarboxylic acid, dimethyl 9,10-anthracenedicarboxylate, 1,2-anthraquinonedicarboxylic acid, dimethyl 1,2-anthraquinonedicarboxylate, 1,3-1,2-anthraquinonedicarboxylic acid, 1,4-anthraquinonedicarboxylic acid, 1,5-anthraquinonedicarboxylic acid, dimethyl 1,5-anthraquinonedicarboxylate, diphenyl 1,5-anthraquinonedicarboxylate, 1,6-anthraquinonedicarboxylic acid, 1,7-anthraquinonedicarboxylic acid, 1,8-anthraquinonedicarboxylic acid, 2,3-anthraquinonedicarboxylic acid, 2,7-anthraquinonedicarboxylic acid, 2,3-biphenyldicarboxylic acid, dimethyl 2,3-biphenyldicarboxylate, 2,5-biphenyldicarboxylic acid, 2,6-biphenyldicarboxylic acid, 3,4-biphenyldicarboxylic acid, dimethyl 3,4-biphenyldicarboxylate, 3,4-biphenyldicarboxylic acid, dimethyl 3,4-biphenyldicarboxylate, 3,4-biphenyldicarboxylic acid, 2,2'-biphenyldicarboxylic acid, dimethyl 2,2'-biphenyldicarboxylate, diphenyl 2,2'-biphenyldicarboxylate, 2,4'-biphenyldicarboxylic acid, dimethyl 2,4'-biphenyldicarboxylate, 3,3'-biphenyldicarboxylic acid, dimethyl 3,3'-biphenyldicarboxylate, 3,4'-biphenyldicarboxylic acid, dimethyl 3,4'-biphenyldicarboxylate, 4,4'-biphenyldicarboxylic acid, dimethyl 4,4'-biphenyldicarboxylate, diphenyl 4,4'-biphenyldicarboxylate, 1,5-biphenylenedicarboxylic acid, dimethyl 1,5-biphenylenedicarboxylate, 1,8-biphenylenedicarboxylate, dimethyl 1,8-biphenylenedicarboxylate, 2,6-biphenylenedicarboxylic acid, dimethyl 2,6-biphenylenedicarboxylate, 2,7-biphenylenedicarboxylic acid, dimethyl 2,7-biphenylenedicarboxylate, 2,2'-dimethyl-4,4'-biphenyldicarboxylic acid, diethyl 2,2'-dimethyl-4,4'-biphenyldicarboxylate, 4,4''-p-terphenyldicarboxylic acid, dimethyl 4,4'''-p-quaterphenyldicarboxylate, 4,4''''-p-quaterphenyldicarboxylic acid, 2,2'-methylenedibenzoic acid, dimethyl 2,2'-methylenedibenzoate, 2,4'-methylenedibenzoic acid, dimethyl 2,4'-methylenedibenzoate, 3,3'-methylenedibenzoic acid, 4,4'-methylenedibenzoic acid, dimethyl 4,4'-methylenedibenzoate, 4,4'-isopropylidenedibenzoic acid, 2,2'-bibenzyldicarboxylic acid, dimethyl 2,2'-benzyldicarboxylate, dimethyl 3,3'-bibenzyldicarboxylate, 4,4'-bibenzyldicarboxylic acid, dimethyl 4,4'-bibenzyldicarboxylate, 2,2'-trans-stilbenedicarboxylic acid, dimethyl 2,2'-trans-stilbenedicarboxylate, diphenyl 2,2'-trans-stilbenedicarboxylate, 2,4'-trans-stilbenedicarboxylic acid, 4,4'-trans-stilbenedicarboxylic acid, 4,4'-trans-stilbenedicarboxylic acid, 2,4'-trans-stilbenedicarboxylic acid, 4,4'-trans-stilbenedicarboxylic acid, dimethyl 4,4'-trans-stilbenedicarboxylate, 2,2'-tolanedicarboxylic acid, dimethyl 2,2'-tolanedicarboxylate, 2,4'-tolanedicarboxylic acid, 4,4'-tolanedicarboxylic acid, dimethyl 4,4'-tolanedicarboxylate, pseudo-p-dicarboxy[2,2]paracyclophane, 4,4'-carbonyldibenzoic acid, 3,3'-oxydibenzoic acid, 4,4'-oxydibenzoic acid, dimethyl 4,4'-oxydibenzoate, diphenyl 4,4'-oxydibenzoate, 4,4'-thiodibenzoic acid, 4,4'-sulfonyldibenzoic acid, dimethyl 4,4'-sulfonyldibenzoate, 3,3'-dithiodibenzoic acid, 4,4'-dithiodibenzoic acid, diethyl 4,4'-dithiodibenzoate, 2,2'-3,3'-dithiodibenzoic acid, 2,2'-azobenzenedicarboxylic acid, dimethyl 2,2'-azobenzenedicarboxylate, 3,3'-azobenzenedicarboxylic acid, dimethyl 3,3'-azobenzenedicarboxylate, 4,4'-azobenzenedicarboxylic acid, dimethyl 4,4'-azobenzenedicarboxylate, homophthalic acid, dimethyl homophthalate, homoisophthalic acid, dimethyl homoisophthalate, homoterephthalic acid, dimethyl homoterephthalate, o-phenylenediacetic acid, diethyl o-phenylenediacetate, m-phenylenediacetic acid, diethyl m-phenylenediacetate, p-phenylenediacetic acid, diethyl p-phenylenediacetate, 3,3'-o-phenylenedipropionic acid, diethyl 3,3'-o-phenylenedipropionate, 3,3'-m-phenylenedipropionic acid, diethyl 3,3'-m-phenylenediproionate, 3,3'-p-phenylenedipropionic acid, diethyl 3,3'-p-phenylenedipropionate, 2-carboxycinnamic acid, 3-carboxycinnamic acid, 4-carboxycinnamic acid, diethyl 4-carboxycinnamate, 3t,3't-o-phenylenediacrylic acid, dimethyl 3t,3't-o-phenylenediacrylate, 3t,3't-m-phenylenediacrylic acid, dimethyl 3t,3't-m-phenylenediacrylate, 3t,3't-p-phenylenediacrylic acid, dimethyl 3t,3't-p-phenylenediacrylate, m-phenylenepropiolic acid, dimethyl m-phenylenepropiolate, 1,4-naphthalenediacetic acid, 1,5-naphthalenediacetic acid, dimethyl 1,5-naphthalenediacetate, 3,3'-(1,4-naphthalene)dipropionic acid, diethyl 3,3'-(1,4-naphthalene)dipropionate, 4,4'-biphenyldiacetic acid, diethyl 4,4'-biphenyldiacetate, 3,3'-(4,4'-biphenyl)dipropionic acid, 3,3'-[4,4'-(methylenedi-p-phenylene)]dipropionic acid, 4,4'-bibenzyldibutyric acid, 3,3'-(4,4'-bibenzyl)dipropionic acid, 4,4'-(oxydi-p-phenylene)dibutyric acid, 3,3'-[4,4'-(oxydi-p-phenylene)]dipropionic acid, 3,3'-[4,4'-(oxydi-p-phenylene)]dibutyric acid, diphenylsulfonedicarboxylic acid, 1,4-cyclohexanedicarboxylic acid, 2,3-furandicarboxylic acid, dimethyl 2,3-furandicarboxylate, 2,4-furandicarboxylic acid, dimethyl 2,4-furandicarboxylate, 2,5-furandicarboxylic acid, dimethyl 2,5-furandicarboxylate, diphenyl 2,5-furandicarboxylate, 3,4-furandicarboxylic acid, dimethyl 3,4-furandicarboxylate, 3,4-diphenyl-2,5-furandicarboxylic acid, dimethyl 3,4-diphenyl-2,5-furandicarboxylate, 3,3'-(2,5-furan)dipropionic acid, dimethyl 3,3'-(2,5-furan)dipropionate, 2,5-cis-tetrahydrofurandicarboxylic acid, dimethyl 2,5-cis-tetrahydrofurandicarboxylate, 3,3'-(2,5-cis-tetrahydrofuran)dipropionic acid, diethyl 3,3'-(2,5-cis-tetrahydrofuran)dipropionate, 2,3-thiophenedicarboxylic acid, dimethyl 2,3-thiophenedicarboxylate, 2,4-thiophenedicarboxylic acid, dimethyl 2,4-thiophenedicarboxylate, 2,5-thiophenedicarboxylic acid, dimethyl 2,5-thiophenedicarboxylate, diphenyl 2,5-thiophenedicarboxylate, 3,4-thiophenedicarboxylic acid, dimethyl 3,4-thiophenedicarboxylate, 3,4-diphenyl-2,5-thiophenedicarboxylic acid, dimethyl 3,4-diphenyl-2,5-thiophenedicarboxylate, 2,5-thiophenediacetic acid, 3,3'-(2,5-thiophene)dipropionic acid, diethyl 3,3'-(2,5-thiophene)dipropionate, 2,5-cis-tetrahydrothiophenedicarboxylic acid, diethyl 2,5-cis-tetrahydrothiophenedicarboxylate, 3,4-cis-tetrahydrothiophenedicarboxylic acid, dimethyl 3,4-cis-tetrahydrothiophenedicarboxylate, 1,1-dioxo-2,5-cis-tetrahydrothiophenedicarboxylic acid, diethyl 1,1-dioxo-2,5-cis-tetrahydrothiophenedicarboxylate, 2,6-4H-pyranedicarboxylic acid, 4-oxo-2,6-4H-pyranedicarboxylic acid, diethyl 4-oxo-2,6-4H-pyranedicarboxylate, 2,6-cis-tetrahydropyranedicarboxylic acid, dimethyl 2,6-cis-tetrahydropyranedicarboxylate, 2,6-cis-tetrahydrothiopyranedicarboxylic acid, dimethyl 2,6-cis-tetrahydrothiopyranedicarboxylate, 1,1-dioxo-2,6-cis-tetrahydrothiopyranedicarboxylic acid, dimethyl 1,1-dioxo-2,6-cis-tetrahydrothiopyranedicarboxylate, 2,8-dibenzofurandicarboxylic acid, dimethyl 2,8-dibenzofurandicarboxylate, 3,7-dibenzofurandicarboxylic acid, dimethyl 3,7-dibenzofurandicarboxylate, 4,6-dibenzofurandicarboxylic acid, dimethyl 4,6-dibenzofurandicarboxylate, 2,8-dibenzothiophenedicarboxylic acid, 5,5-dioxo-2,8-dibenzothiophenedicarboxylic acid, 9-oxo-1,8-xanthenedicarboxylic acid, 9-oxo-2,7-xanthenedicarboxylic acid, dimethyl 9-oxo-2,7-xanthenedicarboxylate, 1,6-dibenzo[1,4]dioxindicarboxylic acid, dimethyl 1,6-dibenzo[1,4]dioxindicarboxylate, 2,7-dibenzo[1,4]dioxindicarboxylic acid, dimethyl 2,7-dibenzo[1,4]dioxindicarboxylate, 2,8-dibenzo[1,4]dioxindicarboxylic acid, dimethyl 2,8-dibenzo[1,4]dioxindicarboxylate, 1,6-phenoxathiindicarboxylic acid, 4,6-phenoxathiindicarboxylic acid, dimethyl 4,6-phenoxathiindicarboxylate, 10,10-dioxo-1,6-phenoxainedicarboxylic acid, dimethyl 10,10-dioxo-1,6-phenoxainedicarboxylate, 10,10-dioxo-1,9-phenoxainedicarboxylic acid, dimethyl 10,10-dioxo-1,9-phenoxainedicarboxylate, 10,10-dioxo-2,8-phenoxainedicarboxylic acid, dimethyl 10,10-dioxo-2,8-phenoxainedicarboxylate, 10,10-dioxo-4,6-phenoxainedicarboxylic acid, 2,7-thianthrenedicarboxylic acid, dimethyl 2,7-thianthrenedicarboxylate, 10,10-dioxo-1,9-thianthrenedicarboxylic acid, 5,5,10,10-tetraoxo-2,7-thianthrenedicarboxylic acid, dimethyl 5,5,10,10-tetraoxo-2,7-thianthrenedicarboxylate, 10-oxo-10-phenyl-2,8-phenoxaphosphinedicarboxylic acid, dimethyl 9-oxabicyclo[3,3,1]nonane-2,6-dicarboxylate, diphenyl 9-oxabicyclo[3,3,1]nonane-2,6-dicarboxylate, 2,4,6,8-tetraoxaspiro[5,5]undecane-3,9-dicarboxylic acid, dimethyl 2,4,6,8-tetraoxaspiro[5,5]undecane-3,9-dicarboxylate, 2,4,6,8-tetraoxaspiro[5,5]undecane-3,9-diacetic acid, diethyl 2,4,6,8-tetraoxaspiro[5,5]undecane-3,9-diacetate, 2,3-pyrroledicarboxylic acid, dimethyl 2,3-pyrroledicarboxylate, 2,4-pyrroledicarboxylic acid, dimethyl 2,4-pyrroledicarboxylate, 2,5-pyrroledicarboxylic acid, dimethyl 2,5-pyrroledicarboxylate, 1-methyl-2,5-pyrroledicarboxylic acid, dimethyl 1-methyl-2,5-pyrroledicarboxylate, 1-phenyl-2,5-pyrroledicarboxylic acid, dimethyl 1-phenyl-2,5-pyrroledicarboxylate, 3,4-pyrroledicarboxylic acid, dimethyl 3,4-pyrroledicarboxylate, 1-methyl-3,4-pyrroledicarboxylic acid, diethyl 1-methyl-3,4-pyrroledicarboxylate, 1-phenyl-3,4-pyrroledicarboxylic acid, diethyl 1-phenyl-3,4-pyrroledicarboxylate, diethyl 3,5-dimethyl-2,4-pyrroledicarboxylate, 2,5-dimethyl-3,4-pyrroledicarboxylic acid, diethyl 2,5-dimethyl-3,4-pyrroledicarboxylate, 1,2,5-trimethyl-3,4-pyrroledicarboxylic acid, diethyl 1,2,5-trimethyl-3,4-pyrroledicarboxylate, 1-methyl-2,5-pyrrolediacetic acid, dimethyl 1-methyl-2,5-pyrrolediacetate, dimethyl 3,3'-(2,5-pyrrole)dipropionate, 3,3'-(1-methyl-2,5-pyrrole)dipropionic acid, dimethyl 3,3'-(1-methyl-2,5-pyrrole)dipropionate, diethyl 3,3'-(1-phenyl-2,5-pyrrole)dipropionate, diethyl 1-methyl-2,5-cis-pyrrolidinedicarboxylate, diethyl 1-phenyl-2,5-cis-pyrrolidinedicarboxylate, diethyl 1-methyl-2,5-pyrrolidinediacetate, 3,3'-(1-methyl-2,5-pyrrolidine)dipropionic acid, diethyl 3,3'-(1-methyl-2,5-pyrrolidine)dipropionate, diethyl 2,5-indoledicarboxylate, 2,6-indoledicarboxylic acid, diethyl 2,6-indoledicarboxylate, 9-methyl-1,8-carbazoledicarboxylic acid, 2,6-carbazoledicarboxylic acid, diethyl 2,6-carbazoledicarboxylate, 3,6-carbazoledicarboxylic acid, diethyl 3,6-carbazoledicarboxylate, 9-methyl-3,6-carbazoledicarboxylic acid, diethyl 9-methyl-3,6-carbazoledicarboxylate, 3,4-pyrazoledicarboxylic acid, dimethyl 3,4-pyrazoledicarboxylate, 2-methyl-3,4-pyrazoledicarboxylic acid, 1-phenyl-3,4-pyrazoledicarboxylic acid, dimethyl 1-phenyl-3,4-pyrazoledicarboxylate, 2-phenyl-3,4-pyrazoledicarboxylic acid, dimethyl 2-phenyl-3,4-pyrazoledicarboxylate, 3,5-pyrazoledicarboxylic acid, dimethyl 3,5-pyrazoledicarboxylate, 1-methyl-3,5-pyrazoledicarboxylic acid, dimethyl 1-methyl-3,5-pyrazoledicarboxylate, 1-phenyl-3,5-pyrazoledicarboxylic acid, dimethyl 1-phenyl-3,5-pyrazoledicarboxylate, 4,5-imidazoledicarboxylic acid, diphenyl 4,5-imidazoledicarboxylate, 1-methyl-4,5-imidazoledicarboxylic acid, dimethyl 1-methyl-4,5-imidazoledicarboxylate, 1-phenyl-4,5-imidazoledicarboxylic acid, diethyl 1-phenyl-4,5-imidazoledicarboxylate, 2,3-pyridinedicarboxylic acid, dimethyl 2,3-pyridinedicarboxylate, diphenyl 2,3-pyridinedicarboxylate, 2,4-pyridinedicarboxylic acid, dimethyl 2,4-pyridinedicarboxylate, diphenyl 2,4-pyridinedicarboxylate, 2,5-pyridinedicarboxylic acid, dimethyl 2,5-pyridinedicarboxylate, diphenyl 2,5-pyridinedicarboxylate, 2,6-pyridinedicarboxylic acid, dimethyl 2,6-pyridinedicarboxylate, diphenyl 2,6-pyridinedicarboxylate, 3,4-pyridinedicarboxylic acid, dimethyl 3,4-pyridinedicarboxylate, 3,5-pyridinedicarboxylic acid, diphenyl 3,5-pyridinedicarboxylate, 2,6-dimethyl-3,5-pyridinedicarboxylic acid, 2,4,6-trimethyl-3,5-pyridinedicarboxylic acid, dimethyl 2,5-piperidinedicarboxylate, diethyl 2,3-piperidinedicarboxylate, 2,6-cis-piperidinedicarboxylic acid, dimethyl 2,6-cis-piperidinedicarboxylate, 1-methyl-2,6-cis-piperidinedicarboxylic acid, dimethyl 1-methyl-2,6-cis-piperidinedicarboxylate, diethyl 3,5-piperidinedicarboxylate, 2,6-cis-piperidinediacetic acid, 1-methyl-2,6-cis-piperidinediacetic acid, diethyl 1-methyl-2,6-cis-piperidinediacetate, 2,3-quinolinedicarboxylic acid, dimethyl 2,3-quinolinedicarboxylate, 2,4-quinolinedicarboxylic acid, dimethyl 2,4-quinolinedicarboxylate, 2,6-quinolinedicarboxylic acid, 3,7-quinolinedicarboxylic acid, 4,8-quinolinedicarboxylic acid, dimethyl 4,8-quinolinedicarboxylate, 5,6-quinolinedicarboxylic acid, dimethyl 5,6-quinolinedicarboxylate, 5,8-quinolinedicarboxylic acid, 6,7-quinolinedicarboxylic acid, dimethyl 6,7-quinolinedicarboxylate, 6,8-quinolinedicarboxylic acid, 7,8-quinolinedicarboxylic acid, 2,2'-bipyridine-4,4'-dicarboxylic acid, dimethyl 2,2'-bipyridine-4,4'-dicarboxylate, 2,2'-bipyridine-5,5'-dicarboxylic acid, dimethyl 2,2'-bipyridine-5,5'-dicarboxylate, 2,2'-bipyridine-6,6'-dicarboxylic acid, dimethyl 3,3'-bipyridine-2,2'-dicarboxylate, 4,5-pyridazinedicarboxylic acid, 4,5-pyrimidinedicarboxylic acid, 4,6-pyrimidinedicarboxylic acid, 2,3-pyrazinedicarboxylic acid, dimethyl 2,3-pyrazinedicarboxylate, 2,5-pyrazinedicarboxylic acid, dimethyl 2,5-pyrazinedicarboxylate, diphenyl 2,5-pyrazinedicarboxylate, 2,6-pyrazinedicarboxylic acid, dimethyl 2,6-pyrazinedicarboxylate, dimethyl 1,4-piperazinediacetate, dimethyl 3,3'-(1,4-piperazine)dipropionate, 1,6-phenazinedicarboxylic acid, and dimethyl 1,6-phenazinedicarboxylate. Among these, total aromatic polycarboxylic acids having a rigid molecular structure which does not contain an alkylene chain in the main chain, may be mentioned, and examples include phthalic acids, terephthalic acids, isophthalic acids, biphenyldicarboxylic acids, naphthalenedicarboxylic acids, oxofluorenedicarboxylic acids, anthracenedicarboxylic acids, anthraquinonedicarboxylic acids, biphenylenedicarboxylic acids, terphenyldicarboxylic acids, quaterphenyldicarboxylic acids, azobenzenedicarboxylic acids, furandicarboxylic acids, thiophenedicarboxylic acids, pyranedicarboxylic acids, dibenzofurandicarboxylic acids, dibenzothiophenedicarboxylic acids, xanthenedicarboxylic acids, dibenzo[1,4]dioxindicarboxylic acids, phenoxathiindicarboxylic acids, thianthrenedicarboxylic acids, phenoxaphosphinedicarboxylic acids, pyrroledicarboxylic acids, indoledicarboxylic acids, carbazoledicarboxylic acids, pyrazoledicarboxylic acids, imidazoledicarboxylic acids, pyridinedicarboxylic acids, quinolinedicarboxylic acids, bipyridinedicarboxylic acids, pyrimidinedicarboxylic acids, pyrazinedicarboxylic acids, and phenazinedicarboxylic acids. Furthermore, acid halides or acid anhydrides of the aforesaid aromatic dicarboxylic acids can also be used. Examples of the acid halides of the aromatic dicarboxylic acids include phthaloyl dichloride, and naphthoyl dichloride. Among these, phthaloyl dichloride is preferred, and for example, isophthaloyl dichloride or terephthaloyl dichloride are used.

In the aromatic polyester of the present invention, when the residues of the aromatic polycarboxylic acid, and acid halide or acid anhydride thereof are composed of isophthaloyl dichloride residues and terephthaloyl dichloride residues, the molar ratio of the isophthaloyl dichloride residues to the terephthaloyl dichloride residues is in the range of 100:0 to 30:70 (exclusive of 100:0), preferably 95:5 to 50:50, more preferably 95:5 to 80:20, and most preferably 95:5 to 85:15. A proportion of the terephthaloyl dichloride residue exceeding the upper limits may cause a significantly low MFR value of the aromatic polyester, resulting in the insoluble and infusible resin. A ratio below the lower limit may also result in a significantly low MFR value of the aromatic polyester, rendering the polyester insoluble and infusible.

The lower limit of the weight average molecular weight (MW) of the aromatic polyesters of the present invention is desirably 2,000, preferably 10,000, more preferably 15,000, and most preferably 20,000. The upper limit of MW is not particularly limited in so far as the polyester can be produced, and preferably 100,000, more preferably 80,000, and most preferably 60,000. Aromatic polyesters having MW below the lower limit is unsuitable for use as optical materials.

The lower limit of the melt flow rate (MFR, units: g/10 min, measurement conditions: 260° C., 10.0 kg) of the aromatic polyester of the present invention is preferably 3.0, and more preferably 4.0. Aromatic polyesters having MRF values below the lower limit cannot be molded at lower temperatures not causing coloration, so that they have to be molded at higher temperatures, resulting in coloration. The upper limit of the MFR is not particularly limited, and preferably 60, more preferably 40, and most preferably 30. The molding temperature can be lowered as the MFR increases, favorably leading to a further reduction in coloring.

The lower limit of the glass transition temperature (Tg) of the aromatic polyester of the present invention is preferably 120° C., more preferably 150° C., most preferably 170° C.; while the upper limit is preferably 250° C., more preferably 220° C., and most preferably 200° C. A glass transition temperature below the lower limit represents low heat resistance of the aromatic polyester, while a glass transition temperature exceeding the upper limit causes a significantly small MRF value.

The aromatic polyester of the present invention can be prepared by the reaction of polyhydric phenol with aromatic polycarboxylic acid, acid halide or acid anhydride thereof;

wherein the polyhydric phenol used comprises a polyhydric phenol represented by Formula (IV):

$$HO—Ar—W^1_x—Ar—OH \qquad (IV)$$

and/or a polyhydric phenol represented by Formula (V):

$$HO—Ar—OH \qquad (V)$$

and a polyhydric phenol represented by Formula (VI):

$$HO—Ar—W^2—Ar—OH \qquad (VI).$$

In Formula (IV), Ar, $W^1$, and x are as defined in Formula (I); In Formula (V), Ar is as defined in Formula (II); and in Formula (VI), Ar and $W^2$ are as defined in Formula (III). Exemplary polyhydric phenols represented by Formulae (IV), (V), and (VI) are the same as the aforesaid polyhydric phenols of Formulae (I), (II), and (III), respectively. Examples of the polyhydric phenol of Formula (IV) used in the present invention preferably includes 2,2-bis(4'-hydroxyphenyl)propane[bisphenol A], 1,1-bis(4'-hydroxyphenyl) ethane, bis(4'-hydroxyphenyl)methane, and more preferably 2,2-bis(4'-hydroxyphenyl)propane[bisphenol A]. Examples of the polyhydric phenol of Formula (V) used in the present invention preferably include 2,6-dihydroxynaphthalene, hydroquinone, resorcinol, and more preferably 2,6-dihydroxynaphthalene. Examples of the polyhydric phenol of Formula (VI) used in the present invention preferably include 1,1-bis(4'-hydroxyphenyl)-1-phenylethane, 2,2-bis(4'-hydroxyphenyl)-1,3-diphenylpropane, more preferably 1,1-bis(4'-hydroxyphenyl)-1-phenylethane. In the preparation of the aromatic polyester of the present invention, the most preferred combination of the polyhydric phenols includes a polyhydric phenol represented by Formula (IV) and a polyhydric phenol represented by Formula (VI), wherein the polyhydric phenol represented by Formula (IV) is 2,2-bis(4'-hydroxyphenyl)propane, and the polyhydric phenol represented by Formula (VI) is 1,1-bis(4'-hydroxyphenyl)-1-phenylethane.

In the preparation of the aromatic polyester of the present invention, the molar ratio of the amount to be fed of the polyhydric phenols represented by Formula (IV) and/or Formula (V) to the amount to be fed of the polyhydric phenol represented by Formula (VI) is generally in the range of 100:0 to 30:70 (exclusive of 100:0), preferably in the range of 95:5 to 50:50, more preferably in the range of 95:5 to 80:20, and most preferably 95:5 to 85:15.

The compounds described above may be used as the aromatic polycarboxylic acids, acid halides or acid anhydrides thereof. Isophthaloyl dichloride and terephthaloyl dichloride are preferably used. The molar ratio of the amount to be fed of isophthaloyl dichloride to the amount to be fed of terephthaloyl dichloride is generally in the range of 100:0 to 30:70 (exclusive of 100:0), preferably in the range of 95:5 to 50:50, more preferably in the range of 95:5 to 80:20, and most preferably 95:5 to 85:15.

The conditions for preparing the aromatic polyesters in the present invention are those known in the art. For example, the polyesters can be prepared at a temperature of −10 to 55° C., for 0.01 to 24 hours under the pressure of 0.01 to 2 MPa, preferably in a nitrogen atmosphere. The preparation may be performed either batchwise or continuously.

In the following Examples, the present invention will be described in more detail, but should not be limited thereto.

EXAMPLES

Each property of polyesters was measured in the following manner.

Glass Transition Temperature (Tg, °C.)

A differential scanning calorimeter (DSC-3100S, manufactured by Bruker AXS Inc.) was used for measurement. Samples used for measurement were in the form of powder. The measurement was conducted in a nitrogen atmosphere.

Weight Average Molecular Weight (Mw)

GPC LC20AT (manufactured by Shimadzu Corporation) was used for measurement. Three columns, Shodex KF802, KF804, and KF806 (trade name) connected in series were used. Chloroform for liquid chromatography was used as elution solvent. Commercially available polystyrenes of known molecular weight were used as standard products.

Melt Flow Rate (MFR, g/10 min)

MELT INDEXER F-W01 (trade name, manufactured by Toyo Seiki Seisaku-Sho, Ltd.) was used for measurement. The measurements were conducted at a temperature of 260° C. under a load of 10.0 Kg in Examples 1 to 4 and Comparative Examples 1 and 2, and at a temperature of 280° C. under a load of 10.0 Kg in Examples 5 to 13 and Comparative Examples 3 to 5.

Total Light Transmittance and Haze

A haze meter NDH 5000 (trade name, manufactured by Nippon Denshoku Industries, Co., Ltd) was used for measurement of films having a thickness of about 0.10 mm, according to JIS K7361.

X-ray Diffractometry

An X-ray diffractometer RINT2000 (trade name, manufactured by Rigaku Corporation) was used for measurement of melt-extruded samples (melt-extrusion conditions: 260° C., load: 10.0 Kg)

$^1$H-NMR Spectroscopy

An FT-NMR spectrometer JNM-EX270 (trade name, manufactured JEOL Ltd.) was used.

Example 1

A conical glass flask was charged with 1,000 ml of dichloromethane. Then 14.76 g (73 mmol) of terephthaloyl dichloride, 14.76 g (73 mmol) of isophthaloyl dichloride and 2.04 g (14.5 mmol) of benzoyl chloride were added and dissolved.

Meanwhile, a round bottom glass flask was charged with 1,100 ml of water. Then 13.20 g (330 mmol) of sodium hydroxide, 18.26 g (80 mmol) of 2,2-bis(4'-hydroxyphenyl)propane [bisphenol A] (i.e., a compound of Formula (IV) where each Ar is a 1,4-phenylene group, x is 1, and $W^1$ is a 2,2-propylene group), and 23.23 g (80 mmol) of 1,1-bis(4'-hydroxyphenyl)-1-phenylethane[4,4'-α-methylbenzylidene)bisphenol] (i.e., a compound of Formula (VI) where each Ar is a 1,4-phenylene group, and $W^2$ is a 1,1'-(1-phenylethylene) group) were added and dissolved with stirring at room temperature for 30 minutes in a nitrogen atmosphere. Then, 11.7 mg (0.036 mmol) of tetra-n-butylammonium bromide was added and stirred at room temperature for 10 minutes in a similar manner.

Subsequently, the entire dichloromethane solution in the conical glass flask was added dropwise to the round bottom flask over a period of 7 minutes, and the mixture was stirred at room temperature for 30 minutes. After the completion of the reaction, the aqueous phase was removed using a separatory funnel. Then, 1,000 ml of water was added to the organic phase, and the funnel was agitated and then was allowed to stand to separate the organic phase. The washing operation was repeated three times. The resulting organic phase was added dropwise to 4.25 liter of a mixed solvent of methanol and water (16:1 v/v) with stirring. The precipitated polymer was collected by filtration and dried at room temperature under reduced pressure to give 51.8 g (84% yield) of white powdered polymer.

The polymer had a weight average molecular weight (Mw) of 23,000, a glass transition temperature (Tg) of 191° C., a melt flow rate (MFR) of 1.82 g/10 min (260° C., 10.0 kg), and a light transmittance (T %) of 89.35%. The molar ratio of the compound represented by Formula (IV) to the compound by Formula (VI) was 50:50, and the molar ratio of isophthaloyl dichloride to terephthaloyl dichloride was 50:50.

Example 2

The procedures of Example 1 were repeated, except that the amounts of bisphenol A and 1,1-bis(4'-hydroxyphenyl)-1-phenylethane were 21.92 g (96 mmol) and 18.58 g (64 mmol), respectively. A white powdered polymer (55.5 g, 91% yield) was obtained.

The polymer had a weight average molecular weight (Mw) of 27,000, a glass transition temperature (Tg) of 194° C., a melt flow rate (MFR) of 1.71 g/10 min (260° C., 10.0 kg), and a light transmittance (T %) of 90%. The molar ratio of the compound represented by Formula (IV) to the compound by Formula (VI) was 60:40, and the molar ratio of isophthaloyl dichloride to terephthaloyl dichloride was 50:50.

Example 3

The procedures of Example 1 were repeated, except that the amounts of bisphenol A and 1,1-bis(4'-hydroxyphenyl)-1-phenylethane were 32.87 g (144 mmol) and 4.65 g (16 mmol), respectively. A white powdered polymer (52.4 g, 58% yield) was obtained.

The polymer had a weight average molecular weight (Mw) of 24,000, a glass transition temperature (Tg) of 180° C., a melt flow rate (MFR) of 10.10 g/10 min (260° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 50:50.

Example 4

The procedures of Example 1 were repeated, except that the amounts of bisphenol A and 1,1-bis(4'-hydroxyphenyl)-1-phenylethane were 14.61 g (64 mmol) and 27.87 g (96 mmol), respectively. A white powdered polymer (56.5 g, 90% yield) was obtained.

The polymer had a weight average molecular weight (Mw) of 27,000, a glass transition temperature (Tg) of 202° C., a melt flow rate (MFR) of 0.59 g/10 min (260° C., 10.0 kg), and a light transmittance (T %) of 90%. The molar ratio of the compound represented by Formula (IV) to the compound by Formula (VI) was 40:60, and the molar ratio of isophthaloyl dichloride to terephthaloyl dichloride was 50:50.

Comparative Example 1

The procedures of Example 1 were repeated, except that 1,1-bis(4'-hydroxyphenyl)-1-phenylethane was not used, while 39.9 g (174 mmol) of bisphenol A was used. A white powdered polymer (41.7 g, 72% yield) was obtained.

The polymer had a weight average molecular weight (Mw) of 25,000, a glass transition temperature (Tg) of 183° C., a melt flow rate (MFR) of 3.75 g/10 min (260° C., 10.0 kg), and a light transmittance (T %) of 90%. The molar ratio of the compound represented by Formula (IV) to the compound by Formula (VI) was 100:0, and the molar ratio of isophthaloyl dichloride to terephthaloyl dichloride was 50:50.

Comparative Example 2

The procedures of Example 1 were repeated, except that bisphenol A was not used, while 1,1-bis(4'-hydroxyphenyl)-1-phenylethane (46.46 g, 160 mmol) and tetra-n-butylammonium bromide (11.7 mg, 0.036 mmol) were used. A white powdered polymer (51.7 g, 77% yield) was obtained.

The polymer had a weight average molecular weight (Mw) of 21,000, a glass transition temperature (Tg) of 215° C., a melt flow rate (MFR) of 0.32 g/10 min (260° C., 10.0 kg), and a light transmittance (T %) of 90%. The molar ratio of the compound represented by Formula (IV) to the compound by Formula (VI) was 0:100, and the molar ratio of isophthaloyl dichloride to terephthaloyl dichloride was 50:50.

Example 5

A conical glass flask was charged with 1,000 ml of dichloromethane. Then 15.4 g (75.8 mmol) of terephthaloyl dichloride, 15.4 g (75.8 mmol) of isophthaloyl dichloride and 2.1 g (15.0 mmol) of benzoyl chloride were added and dissolved.

Meanwhile, a round bottom glass flask was charged with 1,100 ml of water. Then 13.30 g (333 mmol) of sodium hydroxide, 34.2 g (157 mmol) of 2,2-bis(4'-hydroxyphenyl)propane [bisphenol A], and 4.8 g (16.6 mmol) of 1,1-bis(4'-hydroxyphenyl)-1-phenylethane[4,4'-(α-methylbenzylidene)bisphenol] were added and dissolved with stirring at room temperature for 30 minutes in a nitrogen atmosphere. Then, 24.4 mg (0.076 mmol) of tetra-n-butylammonium bromide was added and stirred at room temperature for 10 minutes in a similar manner.

Subsequently, the entire dichloromethane solution in the conical glass flask was added dropwise to the round bottom flask over a period of 7 minutes, and the mixture was stirred at room temperature for 30 minutes. After the completion of the reaction, the aqueous phase was removed using a separatory funnel. Then, 1,000 ml of water was added to the organic phase, and the funnel was agitated and then was allowed to stand to separate the organic phase. The washing operation was repeated three times. The resulting organic phase was added dropwise to 4.25 liter of a mixed solvent of methanol and water (16:1 v/v) with stirring. The precipitated polymer was collected by filtration and dried at room temperature under reduced pressure to give 51.4 g (88.8% yield) of white powdered polymer.

The polymer had a weight average molecular weight (Mw) of 33,000, a glass transition temperature (Tg) of 188° C., a melt flow rate (MFR) of 9.26 g/10 min (280° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 50:50.

Example 6

The procedures of Example 5 were repeated, except that the amounts of bisphenol A and 1,1-bis(4'-hydroxyphenyl)-1-phenylethane were 21.92 g (96 mmol) and 18.58 g (64 mmol), respectively. A white powdered polymer (54.6 g, 90% yield) was obtained.

The polymer had a weight average molecular weight (Mw) of 34,000, a glass transition temperature (Tg) of 192° C., a melt flow rate (MFR) of 5.25 g/10 min (280° C., 10.0 kg), and a light transmittance (T %) of 90%. The molar ratio of the compound represented by Formula (IV) to the compound by Formula (VI) was 60:40, and the molar ratio of isophthaloyl dichloride to terephthaloyl dichloride was 50:50.

Example 7

The procedures of Example 5 were repeated, except that the amounts of bisphenol A and 1,1-bis(4'-hydroxyphenyl)-1-phenylethane were 18.26 g (80 mmol) and 23.23 g (80 mmol), respectively. A white powdered polymer (54.1 g, 87% yield) was obtained.

The polymer had a weight average molecular weight (Mw) of 35,000, a glass transition temperature (Tg) of 194° C., a melt flow rate (MFR) of 2.40 g/10 min (280° C., 10.0 kg), and a light transmittance (T %) of 90%. The molar ratio of the compound represented by Formula (IV) to the compound by Formula (VI) was 50:50, and the molar ratio of isophthaloyl dichloride to terephthaloyl dichloride was 50:50.

Comparative Example 3

The procedures of Example 5 were repeated, except that 1,1-bis(4'-hydroxyphenyl)-1-phenylethane was not used, while 36.5 g (160.1 mmol) of bisphenol A was used. A white powdered polymer (43.8 g, 74% yield) was obtained.

The polymer had a weight average molecular weight (Mw) of 33,000, a glass transition temperature (Tg) of 190° C., a melt flow rate (MFR) of 1.9 g/10 min (280° C., 10.0 kg), and a light transmittance (T %) of 90%. The molar ratio of the compound represented by Formula (IV) to the compound by Formula (VI) was 100:0, and the molar ratio of isophthaioyi dichloride to terephthaloyl dichloride was 50:50.

Example 8

A conical glass flask was charged with 1,000 ml of dichloromethane. Then, 2.95 g (14.5 mmol) of terephthaloyl dichloride, 26.52 g (130 mmol) of isophthaloyl dichloride and 2.04 g (14.5 mmol) of benzoyl chloride were added and dissolved.

Meanwhile, a round bottom glass flask was charged with 1,100 ml of water. Then, 13.2 g (330 mmol) of sodium hydroxide, 32.87 g (144 mmol) of 2,2-bis(4'-hydroxyphenyl)propane [bisphenol A], and 4.65 g (16 mmol) of 1,1-bis(4'-hydroxyphenyl)-1-phenylethane [4,4'-(α-methylbenzylidene)bisphenol] were added and dissolved with stirring at room temperature for 30 minutes in a nitrogen atmosphere. Then, 28.2 mg (0.088 mmol) of tetra-n-butylammonium bromide was added and stirred at room temperature for 10 minutes in a similar manner.

Subsequently, the entire dichloromethane solution in the conical glass flask was added dropwise to the round bottom flask over a period of 7 minutes, and the mixture was stirred at room temperature for 30 minutes. After the end of the reaction, the aqueous phase was removed using a separatory funnel. Then, 1,000 ml of water was added to the organic phase, and the funnel was agitated and then was allowed to stand to separate the organic phase. The washing operation was repeated three times. The resulting organic phase was added dropwise to 4.25 liter of a mixed solvent of methanol and water (16:1 v/v) with stirring. The precipitated polymer was collected by filtration and dried at room temperature under reduced pressure to give 53.8 g (93% yield) of white powdered polymer.

The polymer had a weight average molecular weight (Mw) of 32,000, a glass transition temperature (Tg) of 193° C., a melt flow rate (MFR) of 40.39 g/10 min (280° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 90:10.

Example 9

The procedures of Example 8 were repeated, except that the amounts of bisphenol A and 1,1-bis(4'-hydroxyphenyl)-1-phenylethane were 29.2 g (128 mmol) and 9.3 g (32.0 mmol), respectively. A white powdered polymer (53.2 g, 92% yield) was obtained.

The polymer had a weight average molecular weight (Mw) of 31,000, a glass transition temperature (Tg) of 193° C., a melt flow rate (MFR) of 5.26 g/10 min (280° C., 10.0 kg), and a light transmittance (T %) of 90%. The molar ratio of the compound represented by Formula (IV) to the compound by Formula (VI) was 80:20, and the molar ratio of isophthaloyl dichloride to terephthaloyl dichloride was 90:10.

Example 10

The procedures of Example 8 were repeated, except that the amounts of bisphenol A and 1,1-bis(4'-hydroxyphenyl)-1-phenylethane were 18.3 g (80 mmol) and 23.2 g (80.0 mmol), respectively. A white powdered polymer (39.2 g, 44.6% yield) was obtained.

The polymer had a weight average molecular weight (Mw) of 32,000, a glass transition temperature (Tg) of 193° C., a melt flow rate (MFR) of 7.90 g/10 min (280° C., 10.0 kg), and a light transmittance (T %) of 90%. The molar ratio of the compound represented by Formula (IV) to the compound by Formula (VI) was 50:50, and the molar ratio of isophthaloyl dichloride to terephthaloyl dichloride was 90:10.

Comparative Example 4

The procedures of Example 8 were repeated, except that 1,1-bis(4'-hydroxyphenyl)-1-phenylethane was not used, while 36.5 g (160.1 mmol) of bisphenol A was used. A white powdered polymer (49.5 g, 85.6% yield) was obtained.

The weight average molecular weight (Mw) and the melt flow rate (MFR) were not measured since the polymer was insoluble and infusible. The molar ratio of the compound represented by Formula (IV) to the compound by Formula (VI) was 100:0, and the molar ratio of isophthaloyl dichloride to terephthaloyl dichloride was 90:10.

Example 11

The procedures of Example 8 were repeated, except that the amounts of isophthaloyl dichloride and terephthaloyl dichloride were 23.71 g (117 mmol) and 5.93 g (29 mmol), respectively. A white powdered polymer (50.7 g, 88% yield) was obtained.

The polymer had a weight average molecular weight (Mw) of 29,000, a glass transition temperature (Tg) of 190° C., a melt flow rate (MFR) of 33.82 g/10 min (280° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 80:20.

Example 12

The procedures of Example 8 were repeated, except that the amounts of isophthaloyl dichloride and terephthaloyl dichloride were 17.79 g (88 mmol) and 11.86 g (58 mmol), respectively. A white powdered polymer (45.2 g, 78% yield) was obtained.

The polymer had a weight average molecular weight (Mw) of 34,000, a glass transition temperature (Tg) of 189° C., a melt flow rate (MFR) of 11.30 g/10 min (280° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 60:40.

Example 13

The procedures of Example 8 were repeated, except that the amounts of isophthaloyl dichloride and terephthaloyl dichloride were 15.4 g (75.8 mmol) and 15.4 g (75.8 mmol), respectively. A white powdered polymer (49.6 g, 85.7% yield) was obtained.

The polymer had a weight average molecular weight (Mw) of 35,000, a glass transition temperature (Tg) of 190° C., a melt flow rate (MFR) of 6.22 g/10 min (280° C., 10.0 kg), and a light transmittance (T %) of 90%. The molar ratio of the compound represented by Formula (IV) to the compound by Formula (VI) was 90:10, and the molar ratio of isophthaloyl dichloride to terephthaloyl dichloride was 50:50.

Comparative Example 5

The procedures of Example 8 were repeated, except that terephthaloyl dichloride was not used, while 29.64 g (146 mmol) of isophthaloyl dichloride was used. A white powdered polymer (38.8 g, 67% yield) was obtained.

A weight average molecular weight (Mw) and a melt flow rate (MFR) was not measured since the polymer was insoluble and infusible. The molar ratio of the compound represented by Formula (IV) to the compound by Formula (VI) was 90:10, and the molar ratio of isophthaloyl dichloride to terephthaloyl dichloride was 100:0.

The results of Examples 1 to 13 and Comparative Examples 1 to 5 are shown in Table 1.

TABLE 1

| | Bis-A (mol %) | Bis-B (mol %) | Iso (mol %) | Tere (mol %) | Weight Average Molecular weight (Mw) | MFR (g/10 min) |
|---|---|---|---|---|---|---|
| Ex. 1 | 50 | 50 | 50 | 50 | 23,000 | 1.82 |
| Ex. 2 | 60 | 40 | 50 | 50 | 27,000 | 1.71 |
| Ex. 3 | 90 | 10 | 50 | 50 | 24,000 | 10.1 |
| Ex. 4 | 40 | 60 | 50 | 50 | 27,000 | 0.59 |
| Ex. 5 | 90 | 10 | 50 | 50 | 33,000 | 9.26 |
| Ex. 6 | 60 | 40 | 50 | 50 | 34,000 | 5.25 |
| Ex. 7 | 50 | 50 | 50 | 50 | 35,000 | 2.40 |
| Ex. 8 | 90 | 10 | 90 | 10 | 32,000 | 40.39 |
| Ex. 9 | 80 | 20 | 90 | 10 | 31,000 | 5.26 |
| Ex. 10 | 50 | 50 | 90 | 10 | 32,000 | 7.90 |
| Ex. 11 | 90 | 10 | 80 | 20 | 29,000 | 33.82 |
| Ex. 12 | 90 | 10 | 60 | 40 | 34,000 | 1.30 |
| Ex. 13 | 90 | 10 | 50 | 50 | 35,000 | 6.22 |
| Comp. Ex. 1 | 100 | 0 | 50 | 50 | 25,000 | 3.75 |
| Comp. Ex. 2 | 0 | 100 | 50 | 50 | 21,000 | 0.32 |

TABLE 1-continued

| | Bis-A (mol %) | Bis-B (mol %) | Iso (mol %) | Tere (mol %) | Weight Average Molecular weight (Mw) | MFR (g/10 min) |
|---|---|---|---|---|---|---|
| Comp. Ex. 3 | 100 | 0 | 50 | 50 | 33,000 | 1.90 |
| Comp. Ex. 4 | 100 | 0 | 90 | 10 | — | — |
| Comp. Ex. 5 | 90 | 10 | 100 | 0 | — | — |

Ex = Example,
Comp. Ex = Comparative Example

In Table 1, "Bis-A" denotes bisphenol A, and "Bis-B" denotes 1,1-bis(4'-hydroxyphenyl)-1-phenylethane. Furthermore, "mol %" of Bis-A or Bis-B denotes the molar percentage of Bis-A or Bis-B on the basis of 100 mol % of the total of Bis-A and Bis-B, respectively. "Iso" denotes isophthaloyl dichloride, and "Tere" denotes terephthaloyl dichloride. Also, "mol %" of Iso or Tere denotes the molar percentage of Iso or Tere on the basis of 100 mol % of the total of Iso and Tere, respectively. MFR values of Examples 1 to 4 and Comparative Examples 1 and 2 were measured at a temperature of 260° C. under a load of 10.0 Kg, and those of Examples 5 to 13 and Comparative Examples 3 to 5 were measured at a temperature of 280° C. under a load of 10.0 Kg. The weight average molecular weight (Mw) and melt flow rate (MFR) of the polymers in Comparative Examples 4 and 5 could not be measured since the polymers were insoluble and infusible.

In Examples 1 to 4, aromatic polyesters having weight average molecular weights of 20,000 to 30,000 were prepared by varying the molar ratio of bisphenol A (Bis-A) to 1,1-bis(4'-hydroxyphenyl)-1-phenylethane (Bis-B), while the molar ratio of isophthaloyl dichloride (Iso) to terephthaloyl dichloride (Tere) was maintained at 50/50. A high MFR value was achieved in Example 3 having a molar ratio of bisphenol A to 1,1-bis(4'-hydroxyphenyl)-1-phenylethane of 90/10. Meanwhile, the polymers of Comparative Example 1 using only bisphenol A and Comparative Example 2 using only 1,1-bis(4'-hydroxyphenyl)-1-phenylethane exhibited low MFR values.

In Examples 5 to 7, aromatic polyesters having weight average molecular weights of 30,000 to 40,000 were prepared by varying the molar ratio of bisphenol A to 1,1-bis(4'-hydroxyphenyl)-1-phenylethane, while the molar ratio of isophthaloyl dichloride to terephthaloyl dichloride was maintained at 50/50. A high MFR value was achieved in Example 5 having a molar ratio of bisphenol A to 1,1-bis(4'-hydroxyphenyl)-1-phenylethane of 90/10. Meanwhile, the polymer of Comparative Example 3 using only bisphenol A exhibited a low MFR value.

In Examples 8 to 10, aromatic polyesters having weight average molecular weights of 30,000 to 40,000 were prepared by varying the molar ratio of bisphenol A to 1,1-bis(4'-hydroxyphenyl)-1-phenylethane, while the molar ratio of isophthaloyl dichloride to terephthaloyl dichloride was maintained at 90/10. A significantly high MFR value was achieved in Example 8 having a molar ratio of bisphenol A to 1,1-bis(4'-hydroxyphenyl)-1-phenylethane of 90/10. Meanwhile, the polymer of Comparative Example 4 using only bisphenol A was insoluble and infusible.

In Example 8 and Examples 11 to 13, aromatic polyesters having weight average molecular weights of 30,000 to 40,000 were prepared by varying the molar ratio of isophthaloyl dichloride to terephthaloyl dichloride, while the molar ratio of bisphenol A to 1,1-bis(4'-hydroxyphenyl)-1-phenylethane was maintained at 90/10. A significantly high MFR value was achieved in Example 8 having a molar ratio of isophthaloyl dichloride to terephthaloyl dichloride of 90/10, and the MFR value showed the tendency to decrease as the molar proportion of terephthaloyl dichloride increased. Meanwhile, the polymer of Comparative Example 5 using only isophthaloyl dichloride was insoluble and infusible.

The X-ray diffraction chart of FIG. 1 demonstrates that the aromatic polyester (Example 1) have an amorphous structure resembling that of polymethyl methacrylate (PMMA). The X-ray diffraction chart of FIG. 2 demonstrates that the amorphous degree of the polymer is enhanced as the mole fraction of isophthaloyl dichloride relative to isophthaloyl dichloride increases.

FIG. 3 is an NMR chart of the aromatic polyester prepared in Example 8. The peak (11) at about 9 ppm is assigned to the isophthaloyl dichloride residue. The peak (12) at about 8.3 ppm is assigned to the terephthaloyl dichloride residue. The peak of the isophthaloyl dichloride residue corresponds to one hydrogen atom, while the peak of the terephthaloyl dichloride residue corresponds to four hydrogen atoms; therefore, the peak area of the isophthaloyl dichloride residue is 1/1 of the measured value (1.0), while the peak area of the terephthaloyl dichloride residue is 1/4 of the measured value (0.42556). Consequently, the ratio of the peak area of the isophthaloyl dichloride residue to the peak area of the terephthaloyl dichloride residue is about 9:1. Furthermore, the peak (13) at about 1.7 ppm is assigned to the 2,2-bis(4'-hydroxyphenyl)propane[bisphenol A] residue. The peak area is 1/6 of the measured value (6.99354) since the peak corresponds to six hydrogen atoms of $CH_3$. In addition, the peak (14) at about 2.2 ppm is assigned to the 1,1-bis(4'-hydroxyphenyl)-1-phenylethane[4,4'-α-methylbenzylidene)bisphenol] residue. The peak area is 1/3 of the measured value (0.35894), since the peak corresponds to three hydrogen atoms of $CH_3$. Consequently, the ratio of the peak area of the 2,2-bis(4'-hydroxyphenyl)propane[bisphenol A] residue to the peak area of 1,1-bis(4'-hydroxyphenyl)-1-phenylethane[4,4'-(α-methylbenzylidene)bisphenol] residue is about 9:1. Thus, it was confirmed that the molar ratio of the compounds represented by Formula (IV) to Formula (VI) was 90:10 and the molar ratio of isophthaloyl dichloride to terephthaloyl dichloride was 90:10 in the polyester prepared in Example 8.

The aromatic polyester of the present invention is barely colored during molding processes, and has significantly excellent optical characteristics suitable for optical applications such as lenses, optical elements, display substrates and optical fibers. Furthermore, the aromatic polyester has a high refractive index that is useful in microorganism sensors. The aromatic polyester can also be used in applications which require heat-resistance and anti-radiation property, such as automobile parts and electronic precision parts.

The invention claimed:

1. An aromatic polyester comprising polyhydric phenol residues and residues of aromatic polycarboxylic acid, acid halide or acid anhydride thereof;
   wherein the polyhydric phenol residues comprise polyhydric phenol residues represented by Formula (I):

(I)

where each Ar independently denotes a phenylene or naphthylene group and may be independently substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, an —$SR^1$ group (where $R^1$ denotes a hydrogen atom or an alkyl group having 1 to 4 carbon atoms), and an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and x is 0 or 1, where when x is 1, $W^1$ denotes a saturated or unsaturated acyclic or cyclic alkylene group having 1 to 30 carbon atoms, an oxygen atom, a sulfur atom, sulfinyl group, or sulfonyl group, and when x is 0, two Ar's are covalently bonded by a carbon atom contained in each Ar;
and/or represented by Formula (II):

—O—Ar—O— (II)

where Ar denotes a phenylene or naphthylene group, and Ar may be substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, an —$SR^1$ group (where $R^1$ denotes a hydrogen atom or an alkyl group having 1 to 4 carbon atoms), a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and a phenyl group optionally substituted by an alkyl group having 1 to 4 carbon atoms;
and polyhydric phenol residues represented by Formula (III):

—O—Ar—$W^2$—Ar—O— (III)

where each Ar independently denotes a phenylene or naphthylene group and may be independently substituted by at least one group and/or atom selected from the group consisting of a saturated or unsaturated acyclic or cyclic alkyl group having 1 to 12 carbon atoms, a saturated or unsaturated acyclic or cyclic alkoxy group having 1 to 12 carbon atoms, a halogen atom, a nitro group, a —$SR^1$ group (where $R^1$ denotes a hydrogen atom or an alkyl group having 1 to 4 carbon atoms), and a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and $W^2$ denotes a saturated or unsaturated acyclic or cyclic alkylene group substituted by a phenyl group and/or naphthyl group and having 1 to 30 carbon atoms;
wherein the molar ratio of the polyhydric phenol residues represented by Formula (I) and/or Formula (II) to the polyhydric phenol residues represented by Formula (III) is in the range of 100:0 to 30:70 (exclusive of 100:0).

2. The aromatic polyester according to claim 1, wherein, in Formula (I), each Ar independently denotes a phenylene or naphthylene group and may be independently substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, an —$SR^1$ group (where $R^1$ denotes a hydrogen atom or an alkyl group having 1 to 4 carbon atoms), and an —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and x is 0 or 1, where when x is 1, $W^1$ denotes a saturated or unsaturated acyclic or cyclic alkylene group having 1 to 6 carbon atoms, an oxygen atom, a sulfur atom, a sulfinyl group, or a sulfonyl group, and when x is 0, two Ar's are covalently bonded by a carbon atom contained in each Ar.

3. The aromatic polyester according to claim 1, wherein, in Formula (I), each Ar independently denotes a phenylene or naphthylene group and may be independently substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, an —$SR^1$ group (where $R^1$ denotes a hydrogen atom or an alkyl group having 1 to 4 carbon atoms), and an —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and x is 0 or 1, where when x is 1, $W^1$ denotes a saturated acyclic alkylene group having 1 to 4 carbon atoms, an oxygen atom, a sulfur atom, a sulfinyl group, or a sulfonyl group, and when x is 0, two Ar's are covalently bonded by a carbon atom contained in each Ar.

4. The aromatic polyester according to claim 1, wherein, in Formula (I), each Ar independently denotes a phenylene or naphthylene group and may be independently substituted by at least one group and/or atom selected from the group consisting of a saturated acyclic alkyl group having 1 to 4 carbon atoms, and a halogen atom, and x is 1, and $W^1$ denotes a saturated acyclic alkylene group having 1 to 4 carbon atoms.

5. The aromatic polyester according to claim 1, wherein, in Formula (I), each Ar denotes a phenylene group and may be independently substituted by a saturated acyclic alkyl group having 1 to 4 carbon atoms, x is 1, and $W^1$ denotes a saturated acyclic alkylene group having 1 to 4 carbon atoms.

6. The aromatic polyester according to claim 1, wherein, in Formula (II), Ar denotes a phenylene or naphthylene group, and Ar may be substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, an —$SR^1$ group (where $R^1$ denotes a hydrogen atom or an alkyl group having 1 to 4 carbon atoms), a —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and a phenyl group optionally substituted by an alkyl group having 1 to 4 carbon atoms.

7. The aromatic polyester according to claim 1, wherein, in Formula (II), Ar denotes a phenylene or naphthylene group, and Ar may be substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, an —$SR^1$ group (where $R^1$ denotes a hydrogen atom or an alkyl group having 1 to 4 carbon atoms), a —$R^3$—$NR^2{}_2$ group (where each $R^2$ independently denotes a hydrogen atom or an alkyl group having 1 to 4 carbon atoms; and $R^3$ denotes an alkylene group having 1 to 4 carbon atoms or may be absent), and a phenyl group optionally substituted by an alkyl group having 1 to 4 carbon atoms.

8. The aromatic polyester according to claim 1, wherein, in Formula (II), Ar denotes a phenylene or naphthylene group and may be substituted by at least one group and/or atom selected from the group consisting of a saturated acyclic alkyl group having 1 to 4 carbon atoms and a halogen atom.

9. The aromatic polyester according to claim 1, wherein, in Formula (II), Ar denotes a naphthylene group and may be substituted by at least one group selected from the group consisting of a saturated acyclic alkyl group having 1 to 4 carbon atoms.

10. The aromatic polyester according to claim 1, wherein, in Formula (III), each Ar independently denotes a phenylene or naphthylene group and may be independently substituted by at least one group and/or atom selected from the group consisting of a saturated or unsaturated acyclic or cyclic alkyl group having 1 to 6 carbon atoms, a saturated or unsaturated acyclic or cyclic alkoxy group having 1 to 6 carbon atoms, a halogen atom, a nitro group, a —$SR^1$ group (where $R^1$ denotes a hydrogen atom or an alkyl group having 1 to 4 carbon atoms), and a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and $W^2$ denotes a saturated or unsaturated acyclic or cyclic alkylene group having 1 to 6 carbon atoms and substituted by a phenyl group and/or naphthyl group.

11. The aromatic polyester according to claim 1, wherein, in Formula (III), each Ar independently denotes a phenylene or naphthylene group and may be independently substituted by at least one group and/or atom selected from the group consisting of a saturated acyclic alkyl group having 1 to 4 carbon atoms, a saturated acyclic alkoxy group having 1 to 4 carbon atoms, a halogen atom, a nitro group, a —$SR^1$ group (where $R^1$ denotes a hydrogen atom or an alkyl group having 1 to 4 carbon atoms), and a —$R^3$—$NR^2{}_2$ group (where each $R^2$ independently denotes a hydrogen atom or an alkyl group having 1 to 4 carbon atoms, and $R^3$ denotes an alkylene group having 1 to 4 carbon atoms or may be absent), and $W^2$ denotes a saturated alkylene group having 1 to 4 carbon atoms and substituted by a phenyl group and/or naphthyl group.

12. The aromatic polyester according to claim 1, wherein, in Formula (III), each Ar independently denotes a phenylene or naphthylene group and may be independently substituted by at least one group and/or atom selected from the group consisting of a saturated acyclic alkyl group having 1 to 4 carbon atoms and a halogen atom, and $W^2$ denotes a saturated acyclic alkylene group having 1 to 4 carbon atoms and substituted by a phenyl group and/or naphthyl group.

13. The aromatic polyester according to claim 1, wherein, in Formula (III), each Ar denotes a phenylene group and may be independently substituted by a saturated acyclic alkyl group having 1 to 4 carbon atoms, and $W^2$ denotes a saturated acyclic alkylene group having 1 to 4 carbon atoms and substituted by a phenyl group.

14. The aromatic polyester according to claim 1, wherein the polyhydric phenol residue represented by Formula (I) is a 2,2-bis(4'-hydroxyphenyl)propane residue, the polyhydric phenol residue represented by Formula(II) is a 2,6-naphthalenediol residue, and the polyhydric phenol residue represented by Formula (III) is a 1,1-bis(4'-hydroxyphenyl)-1-phenylethane residue.

15. The aromatic polyester according to claim 1, wherein the polyhydric phenol residues comprise the polyhydric phenol residues represented by Formula (I) and the polyhydric phenol residues represented by Formula (III), the polyhydric phenol residue represented by Formula (I) is a 2,2-bis(4'-hydroxyphenyl)propane residue, and the polyhydric phenol residue represented by Formula (III) is a 1,1-bis(4'-hydroxyphenyl)-1-phenylethane residue.

16. The aromatic polyester according to claim 1, wherein the molar ratio of the polyhydric phenol residues represented by Formula (I) and/or Formula (II) to the polyhydric phenol residues represented by Formula (III) is in the range of 95:5 to 50:50.

17. The aromatic polyester according to claim 1, wherein the molar ratio of the polyhydric phenol residues represented by Formula (I) and/or Formula (II) to the polyhydric phenol residues represented by Formula (III) is in the range of 95:5 to 80:20.

18. The aromatic polyester according to claim 1, wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 100:0 to 30:70 (exclusive of 100:0).

19. The aromatic polyester according to claim 1, wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 95:5 to 50:50.

20. The aromatic polyester according to claim 1, wherein the residues of the aromatic polycarboxylic acid, and acid halide or acid anhydride thereof are an isophthaloyl dichloride residue and a terephthaloyl dichloride residue, and the molar ratio of the isophthaloyl dichloride residue to the terephthaloyl dichloride residue is in the range of 95:5 to 80:20.

21. The aromatic polyester according to claim 1, wherein the weight average molecular weight (Mw) ranges from 2,000 to 100,000.

22. The aromatic polyester according to claim 1, wherein the weight average molecular weight (Mw) ranges from 10,000 to 80,000.

23. The aromatic polyester according to claim 1, wherein the weight average molecular weight (Mw) ranges from 15,000 to 60,000.

24. The aromatic polyester according to claim 1, wherein the melt flow rate (MFR, units: g/10 min, measurement conditions: 260° C., 10.0 kg) is 3.0 or greater.

25. The aromatic polyester according to claim 1, wherein the melt flow rate (MFR, units: g/10 min, measurement conditions: 260° C., 10.0 kg) is in the range of 3.0 to 100.0.

26. The aromatic polyester according to claim 1, wherein the melt flow rate (MFR, units: g/10 min, measurement conditions: 260° C., 10.0 kg) is in the range of 3.0 to 75.0.

27. The aromatic polyester according to claim 1, wherein the melt flow rate (MFR, units: g/10 min, measurement conditions: 260° C., 10.0 kg) is in the range of 3.0 to 50.0.

28. The aromatic polyester according to claim 1, wherein the glass transition temperature (Tg) is in the range of 120° C. to 250° C.

29. The aromatic polyester according to claim 1, wherein the glass transition temperature (Tg) is in the range of 150° C. to 210° C.

30. The aromatic polyester according to claim 1, wherein the glass transition temperature (Tg) is in the range of 170° C. to 200° C.

31. An optical element comprising an aromatic polyester according to claim 1.

32. An optical fiber comprising an aromatic polyester according to claim 1.

* * * * *